(12) United States Patent
Nakashima et al.

(10) Patent No.: US 6,189,014 B1
(45) Date of Patent: Feb. 13, 2001

(54) FILE MANAGEMENT METHOD FOR INTERCHANGEABLE STORAGE MEDIA

(75) Inventors: Kazuo Nakashima; Kenichi Utsumi, both of Kawasaki (JP)

(73) Assignee: Fujitsu Limited, Kawasaki (JP)

( * ) Notice: Under 35 U.S.C. 154(b), the term of this patent shall be extended for 0 days.

(21) Appl. No.: 08/674,611

(22) Filed: Jun. 28, 1996

Related U.S. Application Data

(63) Continuation of application No. 08/212,111, filed on Mar. 11, 1994, now abandoned.

(30) Foreign Application Priority Data

May 25, 1993 (JP) .................................................. 5-122572

(51) Int. Cl.⁷ .................................................. G06F 17/30
(52) U.S. Cl. ........................ 707/200; 369/272; 711/101
(58) Field of Search .................... 395/400, 425, 395/600; 369/272, 275.1–275.3; 707/200; 711/101–105, 4–6

(56) References Cited

U.S. PATENT DOCUMENTS

| | | | |
|---|---|---|---|
| 4,811,124 | * 3/1989 | Dujari et al. | 360/49 |
| 4,833,663 | * 5/1989 | Satoh et al. | 369/32 |
| 4,953,122 | * 8/1990 | Williams | 395/404 |
| 5,075,804 | * 12/1991 | Deyring | 369/49 |
| 5,111,444 | * 5/1992 | Fukushima et al. | 369/58 |
| 5,150,339 | * 9/1992 | Ueda et al. | 369/32 |
| 5,216,656 | * 6/1993 | Sako et al. | 369/59 |
| 5,241,531 | * 8/1993 | Ohno et al. | 369/275.2 |
| 5,321,673 | * 6/1994 | Okazaki | 369/13 |
| 5,323,380 | * 6/1994 | Oda et al. | 369/275.1 |
| 5,325,352 | * 6/1994 | Matsumoto | 369/275.1 |
| 5,537,636 | 7/1996 | Uchida et al. | 395/600 |

FOREIGN PATENT DOCUMENTS

| | | |
|---|---|---|
| 0461668 | * 12/1991 | (EP) . |
| 0487064 | * 5/1992 | (EP) . |
| 0528421 | * 2/1993 | (EP) . |
| 4-156627 | 5/1992 | (JP) . |

* cited by examiner

Primary Examiner—Maria N. Vonbuhr
(74) Attorney, Agent, or Firm—Greer, Burns & Crain, Ltd.

(57) ABSTRACT

A method of managing files of an interchangeable storage medium having a RAM area defining an independent RAM section and a ROM area defining an independent ROM section, each section having a file management area for storing file management data and a file area for storing files. The method includes reading file management information out of a file management area of the ROM section in response to a request for establishing a section in which the RAM area and the ROM area are mixed, converting the file management information of the ROM section to file management information of the mixed RAM-ROM section, writing the file management information of the mixed RAM-ROM section in a file management area of the mixed section, and managing ROM files and RAM files as files of the mixed section.

16 Claims, 18 Drawing Sheets

FIG.5A
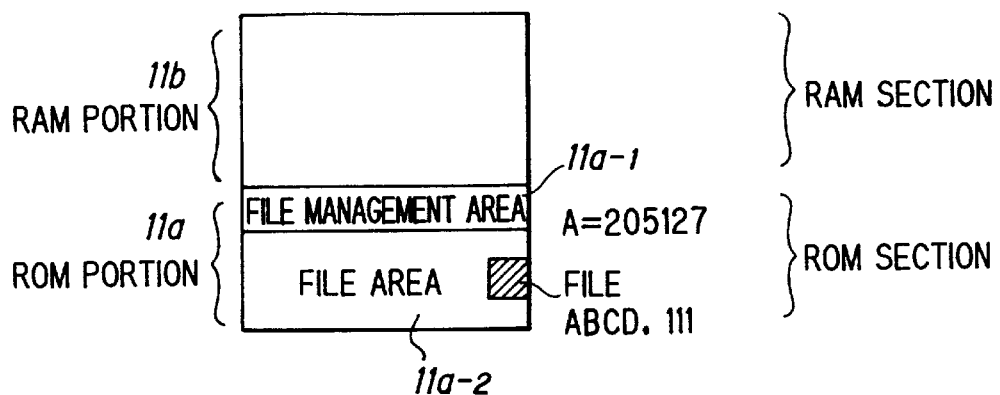
FIG.5B
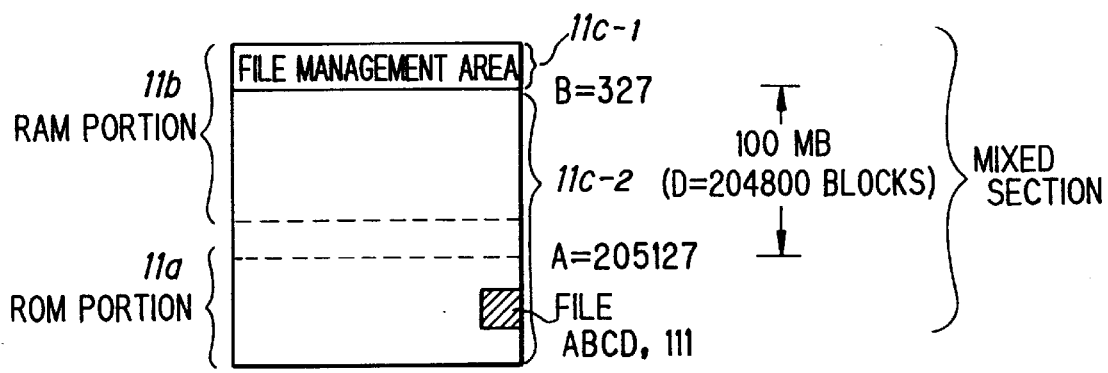
FIG.5C
| | OLD SECTION | NEW SECTION |
|---|---|---|
| STARTING CLUSTER NO. (ENTRY DATA) | 429 | 26029 |

| FILE NAME | LOGICAL STARTING POSITION OF FILE ON DISK |
|---|---|
| ⋮ | ⋮ |
| ABCD.111 | 429 |
| EFGH.222 | 842 |
| IJKL.333 | 899 |
| ⋮ | ⋮ |

FIG. 7A

| FILE NAME | LOGICAL STARTING POSITION OF FILE ON DISK |
|---|---|
| ⋮ | ⋮ |
| ABCD.111 | 26029 |
| EFGH.222 | 26442 |
| IJKL.333 | 26499 |
| ⋮ | ⋮ |

BEFORE CHANGE

BEFORE CHANGE

AFTER CHANGE

AFTER CONVERSION TO SINGLE SECTION

FIG. 10

|  | BEFORE CHANGE ① | AFTER CHANGE ② |
|---|---|---|
| USER BLOCK COUNT | 120826 | 120827 |
| SPARE BLOCK COUNT | 1024 | 1023 |
| REMAINING BLOCK COUNT | 0 | 0 |

FIG. 11A

| FILE NAME | LOGICAL STARTING POSITION OF DISK ON FILE |
|---|---|
| ⋮ | ⋮ |
| ABCD.111 | 30521 |
| EFGH.222 | 30934 |
| IJKL.333 | 30991 |
| ⋮ | ⋮ |

FIG. 13A PRIOR ART
FIG. 13B PRIOR ART
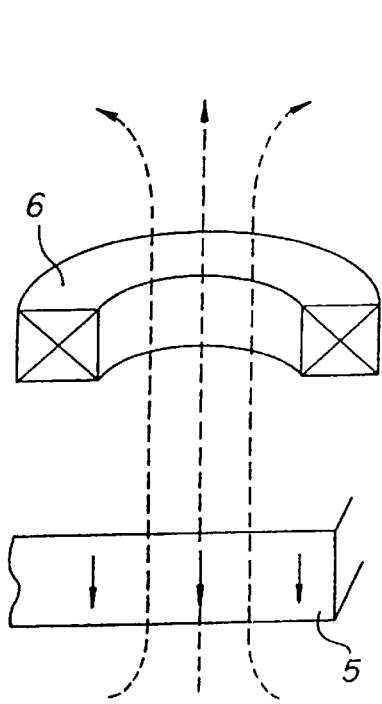
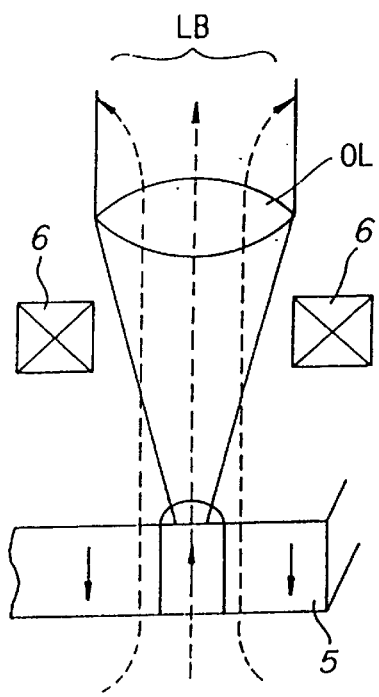
FIG. 13C1 PRIOR ART
FIG. 13C2 PRIOR ART
FIG. 13C3 PRIOR ART
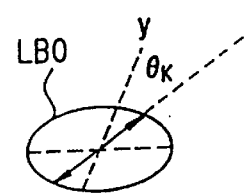
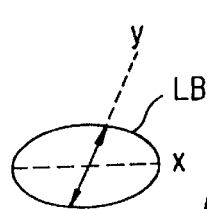
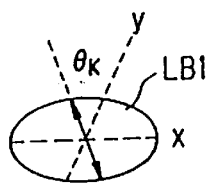
FIG. 13C4 PRIOR ART
FIG. 13C5 PRIOR ART
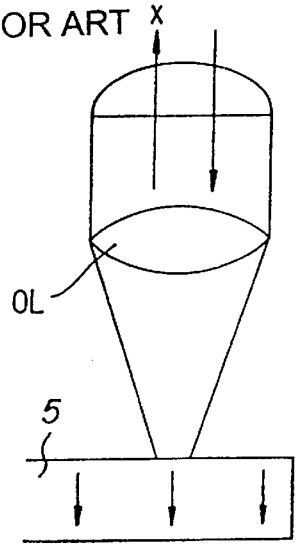
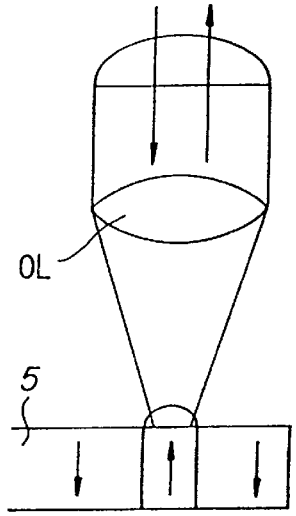

PRIOR ART
FIG. 18

DIRECTORY ENTRIES

| | |
|---|---|
| | |
| 'FILE' | 0004 |
| | |

FAT ENTRIES

| | |
|---|---|
| 0000 | NOT IN USE |
| 0001 | NOT IN USE |
| 0002 | |
| 0003 | |
| 0004 | 0005 |
| 0005 | 0006 |
| 0006 | 000A |
| 0007 | |
| 0008 | |
| 0009 | |
| 000A | FFFF |

FILE MANAGEMENT METHOD FOR INTERCHANGEABLE STORAGE MEDIA

RELATED APPLICATION

This is a continuation of application Ser. No. 08/212,111, filed on Mar. 11, 1994, now abandoned.

BACKGROUND OF THE INVENTION

This invention relates to a method of managing files in an interchangeable storage medium. More particularly, the invention relates to a file management method for an interchangeable storage medium having a RAM area and a ROM area, in which these areas serve as mutually independent RAM and ROM sections, respectively, and each section has a file management area for storing file management data and a file area for storing files.

In an optical disk, laser light is narrowed down to a very small beam spot having a diameter of about 1 μm to perform recording and playback of information signals. This is advantageous in that recording density is high and memory cost low on a per-bit basis. Moreover, high-speed access is possible and recording/playback can be carried out in a contactless manner. Such optical disks have been put into practical use as high-density large-capacity memories.

Optical disks can be classified broadly into optical disks (ROM disks) on which information is stored in advance and only reproduction is possible, optical disks (RAM disks) that allow information to be both recorded and reproduced, and partial-ROM disks in which a single optical disk has both of the above-mentioned features.

As shown in FIG. 12A, a ROM disk is such that information is recorded as pits 2 in a transparent plastic layer 1, a metal film (e.g., aluminum) 3 is formed on the pit surface as by vapor deposition, and a protective layer 4 is provided on the metal film 3. In a ROM disk of this kind, the signal layer (the pits and metal film) is irradiated with a laser beam LB via an objective lens OL, as illustrated in FIG. 12B. When this done, almost all of the light returns intact from locations devoid of pits, whereas the light is refracted by pits at locations where the pits are present. Only some of the returned light actually returns to the objective lens OL since part of the light falls outside the visual field of the objective lens. Accordingly, the information can be read by using a photodiode to detect the returning light. Thus, with a ROM disk, information is recorded in the form of pits. This is advantageous in that the information is less likely to be damaged in comparison with magnetic recording, and a large quantity of information can readily be produced on a large number of disks by stamping. Such an optical disk is effective as a storage medium for electronic publishing. A shortcoming, however, is that it is not possible for the user to write information such as text on the ROM disk himself.

A RAM disk (a photomagnetic disk) is obtained by coating a disk surface with a magnetic film such as a thin film of TbFeCo. Such a disk utilizes a property according to which the retentiveness necessary for magnetic reversal of the magnetic film diminishes in conformity with a rise in temperature (retentiveness is zero at the Curie point). More specifically, recording and erasure are performed by irradiating the disk with a laser beam to raise the temperature of the disk medium to the vicinity of 200° C., thereby weakening retentiveness, applying a weak magnetic field under this condition and controlling the direction of magnetization. Accordingly, as illustrated in FIG. 13A, an upwardly directed magnetic field is applied by a writing coil 6 under a condition in which the direction of magnetization of a magnetic film 5 is pointed downward. When a portion at which the direction of magnetization is desired to be changed is irradiated with a laser beam LB via an objective lens OL, as shown in FIG. 13B, the direction of magnetization of this portion reverses, i.e., is pointed upward. This makes it possible to record information. When information is read, the magnetic film 5 is irradiated with a laser beam LB having a plane of polarization along the y axis, as illustrated in FIGS. 13C1, 13C2, 13C3, 13C4 and 13C5. When this is done, reflected light LBO, in which the plane of polarization has been rotated by $\theta_k$ in the clockwise direction owing to the magnetic Kerr effect, is obtained in the portion where magnetization is downwardly directed. In the portion where magnetization is upwardly directed, reflected light LB1, in which the plane of polarization has been rotated by $\theta_k$ in the counter-clockwise direction owing to the magnetic Kerr effect, is obtained. Accordingly, the direction of magnetization, namely information, can be read by detecting the state of polarization of reflected light. Since a RAM disk can thus be rewritten, a user is capable of writing information such as text at will, unlike the case with a ROM disk. With a RAM disk, therefore, established information such as a system program and character fonts is recorded in a prescribed area of the disk, this area is made a write-inhibit area and other areas can be used as areas for recording user-created text, additional information and version upgrading information. However, a RAM disk requires that the established information be written thermomagnetically item by item. As a consequence, fabrication takes time and raises cost.

A partial ROM (a partial-ROM photomagnetic disk) has a ROM area whose structure is identical with that of a ROM disk, and a RAM area whose structure is identical with that of a RAM disk. As a result, fixed information such as a system program and character fonts can be recorded in the ROM area by stamping, thus eliminating the need to write the information item by item. In addition, the user is capable of writing text in the RAM area at will. In other words, a partial ROM is ideal for applications in which there is a need for an area (a ROM area) that stores fixed information as well as a rewritable area (a RAM area) on one and the same disk.

FIG. 14 is a diagram for describing the construction of a typical partial ROM. FIG. 14A is a schematic plan view, 14B a partially enlarged explanatory view of the partial ROM and 14C a partial sectional view of the same. In FIGS. 14A–14C, the partial ROM 11 has 10,000 tracks per side, in which the tracks are concentric circles or spiral in form. All of the tracks are divided into 25 sectors (25 blocks) ST. Each sector ST is composed of 512 bytes. The header of each sector ST is provided with an address field AF, with the rest of the sector being a data field DF. Address information is recorded in the address field AF and data is stored in the data field DF. The address information includes a sector mark, a track address, a sector address and a preamble for reproducing a synchronizing signal.

The outermost band and innermost band of the storage area of the partial ROM 11 is provided with a defect management area DMA. The defect management area DMA is provided with a disk definition se ctor DDS. Media type (i.e., whether the medium is a ROM or not), RAM area information and ROM area in formation are entered in the disk definition sector DDS.

The partial-ROM photomagnetic disk 11 has the above-described physical format. The outer side of the disk is a ROM area (ROM section) ha, and the inner side is a RAM area (RAM section) lb. As shown in FIG. 14C, the partial ROM 11 is composed of a transparent plastic layer PLS, in which pits PT are formed in part of the ROM area by stamping, a magnetic film MGF deposited on the plastic layer PLS, and a protective layer PRF formed on the magnetic film MGF. The ROM area 11a and the address fields AF are formed by stamping, fixed information such as a system program and character fonts is recorded in the ROM area 11a in the form of the pits PT, and address information is recorded in the address fields AF in the form of pits. A track guide groove TRG (see FIG. 14B) used in a tracking servo also is formed by stamping. The RAM area 11b and the defect management areas DMA are formed by coating the entire surface of the plastic layer PLS with the photomagnetic film MGF. In this case, the magnetic film is formed on the ROM area 11a as well but the inner circumferential portion other than the ROM area serves as a RAM area. The reading of information from the ROM area 11a is performed by irradiating this area with the laser beam LB via the objective lens OL and detecting the returning light. The writing of information in the RAM area 11b is performed by applying a magnetic field using a write coil (not shown) and irradiating the portion in which information is to be written with the laser beam LB via the objecting lens OL. The reading of information from the RAM area 11b is performed by utilizing the fact that the plane of polarization is rotated in the opposite direction, in conformity with the direction of magnetization, owing to the magnetic Kerr effect.

As mentioned above, the defect management areas DMA are provided with the disk definition sector DDS, in which media type (i.e., whether the medium is a ROM or not), RAM area information and ROM area information, etc., are entered. FIG. 15 is a diagram for describing the disk definition sector DDS. The sector is provided with a DDS identifier space 12a, a space (media type) 12b indicating whether the medium is a ROM disk or not, a RAM-area information space 12c, a ROM-area information space 12d, and a space 12e indicating the starting address of the defect management area. The following is entered in the RAM-area information space 12c: ① group count 12c-1, namely the number of RAM groups obtained when the RAM area is divided into a plurality of groups; ② data sector count (user block count) 12c-2, namely the number of data sectors in each RAM group; and ③ spare sector count (spare block count) 12c-3, namely the number of spare sectors used as substitutes in a case where a failure develops in a user block. A count 12d-1 of ROM groups and a count (user block count) 12d-2 of data sectors in each ROM group are entered in the ROM-area information space 12d.

A section is provided with a file management area for storing file management data and a file area for storing files. FIG. 16 is a diagram for describing the structure of a section. Numeral 13 denotes the section, 13a a file management area and 13b a file area. The following is stored in the file management area 13a: a disk descriptor 13a-1; redundant first and second space allocation tables (file allocation tables, abbreviated to "FAT") 13a-2, 13a-3; and a directory (information indicative of table of contents) 13a-4 designating the first cluster number of each file.

The disk descriptor 13a-1 describes the volume structure parameters of the disk, namely sector size (number of bytes per sector) SS, count SC of sectors (blocks) per cluster, count FN (=2) of FATs, count RDE of entries in a root directory, total count TS of sectors, count SF of sectors per FAT, and count SPT of sectors per track.

The FATs 13a-2, 13a-3 are each constituted by a format identifier (FI) 14a and a FAT entry portion 14b. When the content of the format identifier 14a is $FD_H$ (where H signifies hexadecimal notation), this means that the disk possesses a volume structure stipulated by ISO 7487. When the content of the format identifier 14a is $F9_H$, this means that the volume structure parameters are specified by the disk descriptor 13a-1. The FAT entry portion 14b has FAT entries the number of which is equivalent to the number of clusters in the section. The FAT entries take on values of 0000, 0002~MAX, FFF7, FFFF, respectively, in which 0000 means that the cluster is not in use. Further, 0002~MAX mean that the cluster is in use, with the next storage location of a file being designated by the particular value. Further, FFF7 means that there is a defect in the sector constituting the cluster, and FFFF signifies end of file.

As shown in FIG. 17, each directory entry (32 bytes) in the directory 13a-4 has a space 15a for a file name, a space 15b for a file name extension, a space 15c for an attribute indication, a space 15d for a reserved field, a space 15e for file modification time, a space 15f for a file modification date, a space 15g for a starting cluster number of a file, and a space 15h for file length. FIG. 18 is a diagram for describing directory entries, which indicates the storage location of a file name "FILE", as well as FAT entries. It is assumed here that a file named "FILE" has been stored at cluster numbers $0004_H \rightarrow 0005_H \rightarrow 0006_H \rightarrow 000A_H$. The starting cluster number "0004" of a file is stored at a directory entry in correlation with the file name "FILE". A cluster number "0004" indicating the next storage location of a file is stored at the FAT entry of cluster number 0005, a cluster number "0005" indicating the next storage location of a file is stored at the FAT entry of cluster number 0006, a cluster number "0006" indicating the final storage location of a file is stored at the FAT entry of cluster number 000A, and a cluster number "FFFF" indicating end of file is stored at the FAT entry of cluster number 000A.

As shown in FIG. 19A, the partial ROM has the ROM area 11a and the RAM area 11b. There are cases in which these areas are dealt with as independent sections (ROM section and RAM section). When the ROM area and RAM area are sections that are independent of each other, this is advantageous at the time of manufacture because file management information for the ROM section can be recorded in simple fashion by stamping. Moreover, files can be put in order independently section by section.

There are cases in file management in which certain users wish to handle a file (a ROM file) in the ROM section and a file (a RAM file) in the RAM section in a unified manner in the same level of the hierarchy. More specifically, there are cases in which a user may desire to treat all files (ROM files and RAM files) as files of a single united section that is a ROM-RAM mixture, as illustrated in FIG. 19B. However, in the conventional partial ROM in which the ROM area and RAM area are independent sections, the file management information of the ROM section is stored in the ROM area 11a and the file management information of the RAM section is stored in the RAM area 11b. This means that ROM files and RAM files cannot be handled in the same level of the hierarchy.

Further, there are instances in which file management information and ROM files are recorded in the ROM area by stamping and supplied by the manufacturer. In such instances there are occasions where it is desired that the entire partial ROM be made a partial ROM composed of a single united section that is a ROM-RAM mixture. However, a problem encountered is that the conversion to the single section cannot be made.

SUMMARY OF THE INVENTION

Accordingly, a first object of the present invention is to provide a method of managing the files of an interchangeable storage medium in which the ROM area and the RAM area are independent sections, wherein the interchangeable storage medium can be converted to a storage medium having a mixed section that is ROM-RAM mixture.

A second object of the present invention is to provide a method of managing the files of an interchangeable storage medium, wherein the files of a RAM area and the files of a ROM area can be managed as the files of the same section.

A third object of the present invention is to provide a method of managing the files of an interchangeable storage medium in which the ROM area and the RAM area are independent sections, wherein the interchangeable storage medium can be converted to a storage medium having a mixed section that is ROM-RAM mixture in such a manner that the first block of a ROM file will become the starting block of a prescribed cluster in a single section.

In accordance with the present invention, the first and second objects are attained by providing a file management method having a step of reading file management information out of a file management area of a ROM section in response to a request for establishing a section in which a RAM area and a ROM area are mixed, a step of converting the file management information of the ROM section to file management information of the mixed RAM-ROM section, a step of writing the file management information of the mixed section in a file management area of the mixed section, and a step of managing ROM files and RAM files as files of the mixed section.

In accordance with the present invention, the third object is attained by providing a file management method having a step of deciding a file starting position of a mixed section in such a manner that a logical block count D between a file starting position A of a ROM section and a file starting position B of the mixed section is divided by a block count S per cluster, and a step of adding an offset cluster count C (=D/S) to a cluster number of directory information and to a cluster number of a space-allocation management table, which are contained in file management information of the ROM section, to thereby convert the file management information of the ROM section into file management information of the mixed section.

In accordance with the present invention, the first and second objects are attained by providing a file management method having a step of reading file management information out of a file management area of a ROM section in response to a request for establishing a single section in which the entirety of a RAM area and the entirety of a ROM area are mixed, a step of converting the file management information of the ROM section into file management information of the single mixed RAM-ROM section, a step of writing the file management information of the single section in a file management area of the single section, and a step of managing ROM files and RAM files as files of the single section.

In accordance with the present invention, the third object is attained by providing a file management method having an adjusting step which, in a case where a logical block count D between a file-area starting position A of a ROM section and a file-area starting position (fixed) B of a unitary section is indivisible by a block count S per cluster, is a step of adjusting a logical block number of the file-area starting position A of the ROM section by increasing or decreasing a user block count (logical block count) of a RAM area in such a manner that logical block count D will be divisible by the block count S per cluster, and a step of adding an offset cluster count C (=D/S) to a cluster number of directory information and to a cluster number of a space-allocation management table, which are contained in file management information of the ROM section, thereby to convert the file management information of the ROM section into file management information of the mixed section.

Other features and advantages of the present invention will be apparent from the following description taken in conjunction with the accompanying drawings.

BRIEF DESCRIPTION OF THE DRAWINGS

FIG. 5 is a diagram useful in describing processing for forming a mixed section, in which FIG. 5A is a diagram for describing a file-area starting position of a ROM section, FIG. 5B is a diagram for describing a file-area starting position of a mixed section, and FIG. 5C is a diagram for describing a cluster number at the head of a file before and after forming a mixed section;

FIG. 6 is a diagram for describing file management information of a ROM section, in which

FIG. 7 is a diagram for describing file management information in a case where a mixed section has been formed, in which FIG. 7A is a diagram for describing directory information and FIG. 7B is a diagram for describing a space-allocation management table;

FIG. 10 is a diagram for describing a RAM area;

FIG. 11 is a diagram for describing file management information in a case where a single section has been formed, in which FIG. 11A is a diagram for describing directory information of a mixed-section disk and FIG. 11B is a diagram for describing a space-allocation management table of a mixed-section disk;

FIGS. 13A, 13B, 13C1, 13C2, 13C3, 13C4 and 13C5 are diagrams for describing writing/reading of a photomagnetic disk;

FIG. 18 is a diagram for describing file management; and

DESCRIPTION OF THE PREFERRED EMBODIMENT (a) Description of general features of the invention FIGS. 1A, 1B and 1C are diagrams for describing the general features of the present invention. Numeral 11 denotes a partial ROM having a ROM section and a RAM section as independent sections. Numeral 11' denotes a partial ROM in which a conversion has been made to a section that is a ROM-RAM mixture. The partial ROM 11 includes a ROM area 11a and a RAM area 11b. The ROM area 11a forms a ROM section, and the RAM area 11b forms a RAM section. The ROM area 11a has a file management area 11a-1 and a file area 11a-2, and the RAM area 11b has a file management area 11b-1 and a file area 11b-2. The partial ROM 11' includes a file management area 11c-1 of the mixed section and a file area 11c-2 of the mixed section.

Figure 1A:
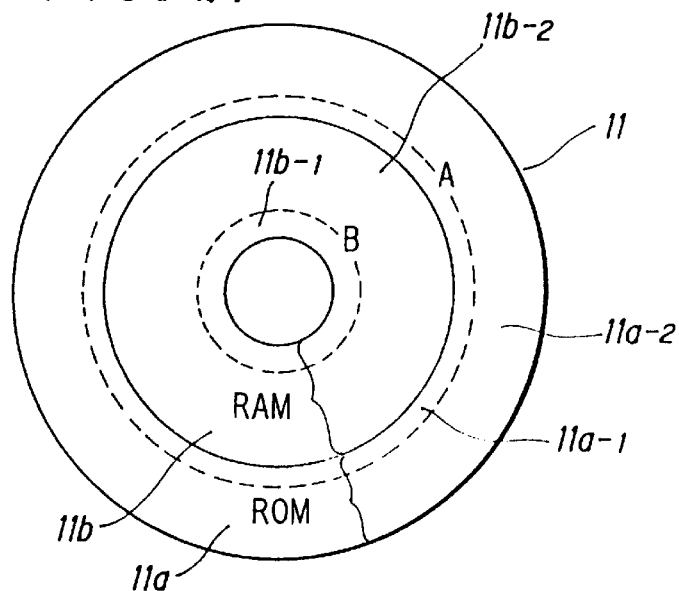
FIGS. 1A, 1B and 1C are diagrams for describing the general features of the present invention.
Figure 1B:
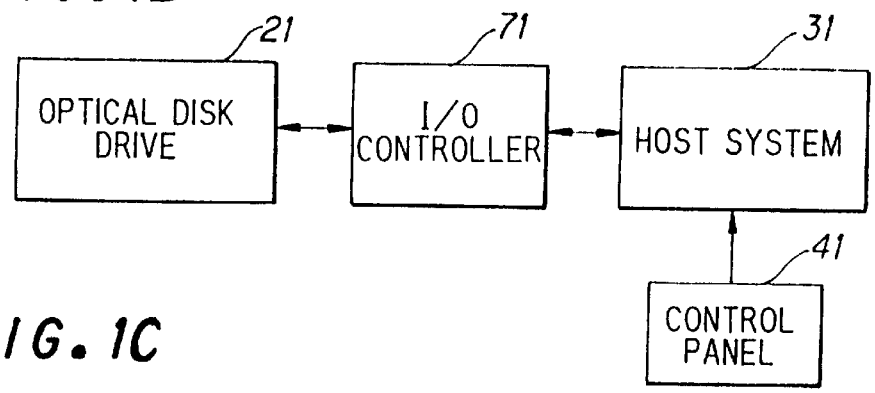
Figure 1C:
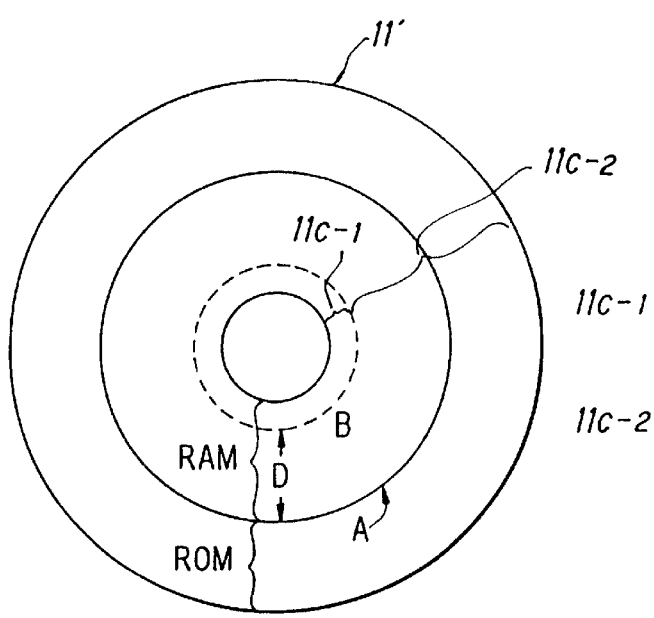

Numeral 21 denotes an optical disk drive for writing data on an optical disk at a designated location thereof and reading data from the optical disk at a designated location thereof. Numeral 31 denotes a host system, 41 a data input unit (control panel) and 71 an I/O controller for supervising an exchange of data between the optical disk drive and the host system.

A mixed-section conversion request is entered from the control panel 41 in order to convert the partial ROM 11, which has the ROM section and the RAM section as independent sections, to the partial ROM 11' having the section in which the ROM and RAM are mixed. In response to the request, the host system 31 reads the file management information out of the file management area 11a-1 of the ROM section 11a via the I/O controller 71 and converts this file management information into file management information of the mixed section. For example, the cluster number in a directory (table-of-contents information) and the cluster number in a space-allocation management table, which are included in the file management information, are converted to cluster numbers of the mixed section. Next, the host system 31 writes the file management information of the mixed section in the file management area 11c-1 of the mixed section via the I/O controller 71. As a result, the partial ROM 11', which has the file management area 11c-1 of the mixed section and the mixed ROM-RAM file area 11c-2, is obtained from the partial ROM 11 having the ROM section and the RAM section as independent sections. In other words, an interchangeable storage medium having a ROM area and a RAM area as independent sections can be converted to a storage medium having a mixed ROM-RAM section. Further, files of the ROM area and files of the RAM area can be managed as files of the same area.

More specifically, the partial ROM 11 having the ROM section and the RAM section as independent sections is converted to the partial ROM 11' having the mixed ROM-RAM section in the manner set forth below. It should be noted that the optical disk is logically formatted so as to allow a plurality of sections to be placed on a single disk. In other words, it is assumed that logical formatting has been performed so that section positions can be set at will. Further, it is assumed that a mixed ROM-RAM area is formed by a ROM area and part of a RAM area.

First, the storage capacity of the mixed section that is desired to be obtained, or a difference D between the storage capacity of this mixed section and the storage capacity of the ROM section, is entered. Next, a starting position A of the file area 11a-2 of the ROM section 11a is obtained by the logical block number, the difference D between the storage capacity of the mixed section and the storage capacity of the ROM section is obtained in the form of a block count, and a position offset from the file starting position A of the ROM section by the difference D is obtained as a file starting position B of the mixed section. Thereafter, the logical block count D between the file starting position A of the ROM section and the file starting position B of the mixed section is divided by the number of blocks per cluster to obtain an offset cluster count C between the two positions, the offset cluster count C is added to the cluster number in the directory and to the cluster number in the space-allocation management table, both of which are contained in the file management information of the ROM section 11a, thereby to convert the file management information of the ROM section to file management information of the mixed section. This file management information is written in the file management area 11c-1 of the mixed section. As a result, the partial ROM 11', which has the file management area 11c-1 of the mixed section and the mixed ROM-RAM file area 11c-2, is obtained from the partial ROM 11 having the ROM section and the RAM section as independent sections.

In a case where the logical block count D is found to be indivisible when it is divided by the block count per cluster, the allowable difference D is corrected to D' which is divisible by the block count per cluster, and a position offset from the file starting position A of the ROM section by the corrected allowable difference D' is adopted as the file starting position B of the mixed section. If this arrangement is adopted, the first block of a ROM file can be made the first block of a cluster even if the conversion to a mixed section is made. This makes it possible to access the ROM file with assurance. It should be noted that accessing is not possible unless the first block of a file is the first block of a cluster.

Further, the entirety of an interchangeable storage medium having a RAM area and a ROM area, in which the ROM area serves as a ROM section and the ROM section is provided with a file management area and a file area, may be converted to a single section that is a ROM-RAM mixture. Specifically, a request is generated in order to establish a single section in which a RAM area and a ROM area are mixed. In response to the request, the file management information is read out of the file management area of the ROM section, the file management information of this ROM section is converted to file management information of the single ROM-RAM section, the file management information of this single section is written in the file management area of the single section, and ROM files and RAM files are managed as files of the single section.

More specifically, first the starting position A of the file area 11a-2 of the ROM section 11a and the starting position B of the file area of the single section are obtained in the form of the respective logical block numbers, and then the difference between these two numbers is divided by the block count SC per cluster to find the offset cluster number C between the starting positions A and B. Next, the offset cluster count C is added to a cluster number in the directory and to a cluster number in the space-allocation management table, both of which are contained in the file management information of the ROM section 11a, thereby to convert the file management information of the ROM section to file management information of the single section. This file management information is written in the file management area 11c-1 of the single section.

In a case where the above-mentioned difference is found to be indivisible when it is divided by the block count per cluster, the logical block number of the file-area starting position A of the ROM section 11a is adjusted by increasing or decreasing the logical block count of the RAM area 11b in such a manner that the difference will be rendered divisible. For example, since the RAM area has user blocks for storing data and spare blocks employed as substitutes if user blocks fail, the user block count (i.e., the logical block count) is increased or decreased, and the spare block count is decreased or increased in such a manner that the total block count of the RAM area will not change. As a result, the file starting position of the ROM section is adjusted so that the aforesaid difference will be divisible by the block count SC per cluster. If this arrangement is adopted, the first block of a ROM file can be made the first block of a cluster even if the conversion to a single section is made. This makes it possible to access the ROM file with assurance.

(b) System configuration of the invention

Figure 2:
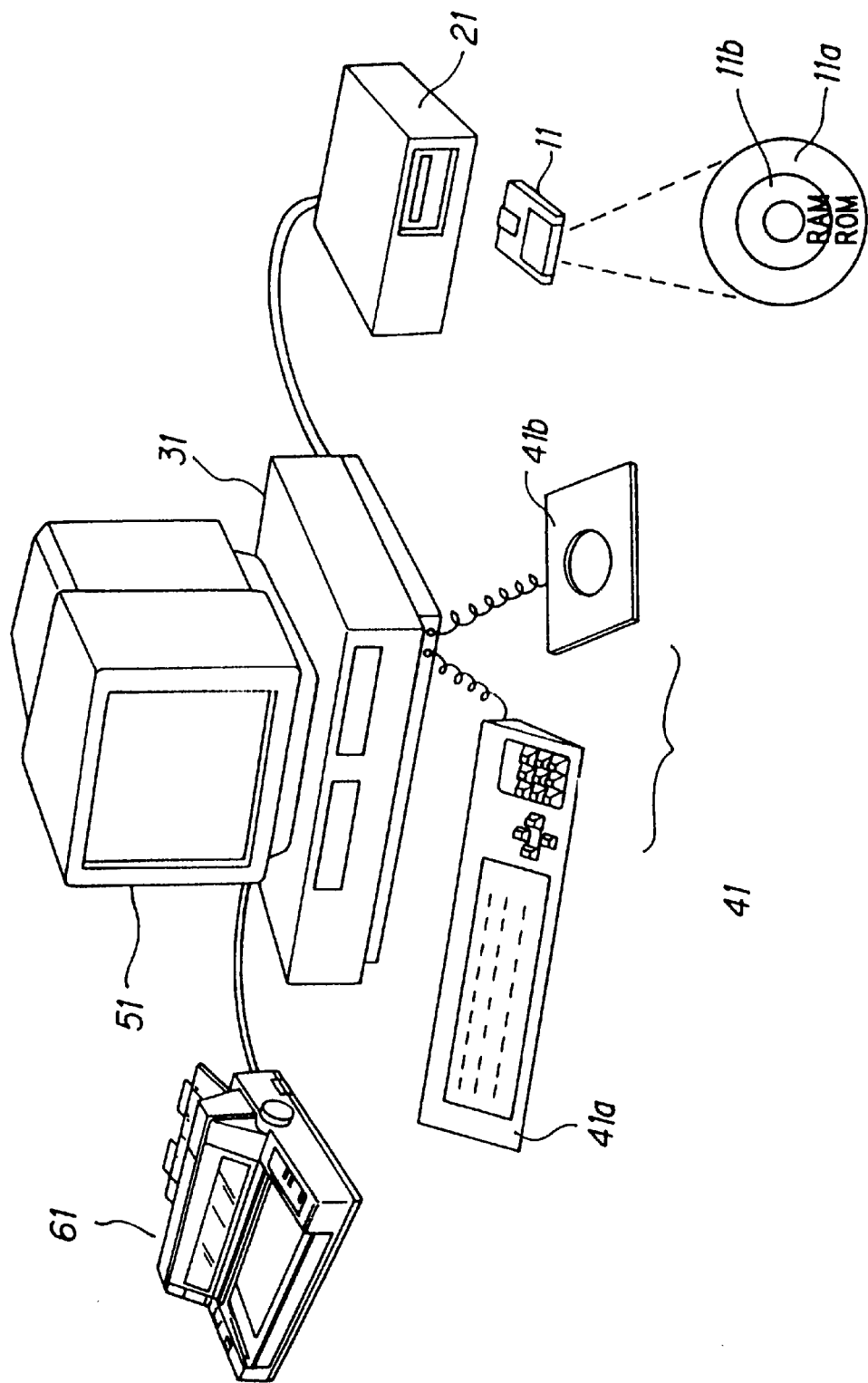
FIG. 2 is a diagram illustrating the configuration of a system to which the present invention can be applied.

FIG. 2 is an external view illustrating a system to which the present invention is applicable. The system includes the partial-ROM photomagnetic disk (referred to simply as a "partial ROM") 11, the photomagnetic disk drive 21, the host system 31 (the main body of a computer), and the data input unit (control panel) 41, which has a keyboard 41a and a mouse 41b. Numeral 51 denotes a display unit such as a CRT or liquid-crystal display, and 61 represents a printer. The partial ROM 11 has the ROM area (ROM portion) 11a and the RAM area (RAM portion) 11b. These areas are independent sections (a ROM section and a RAM section, respectively).

Figure 3:
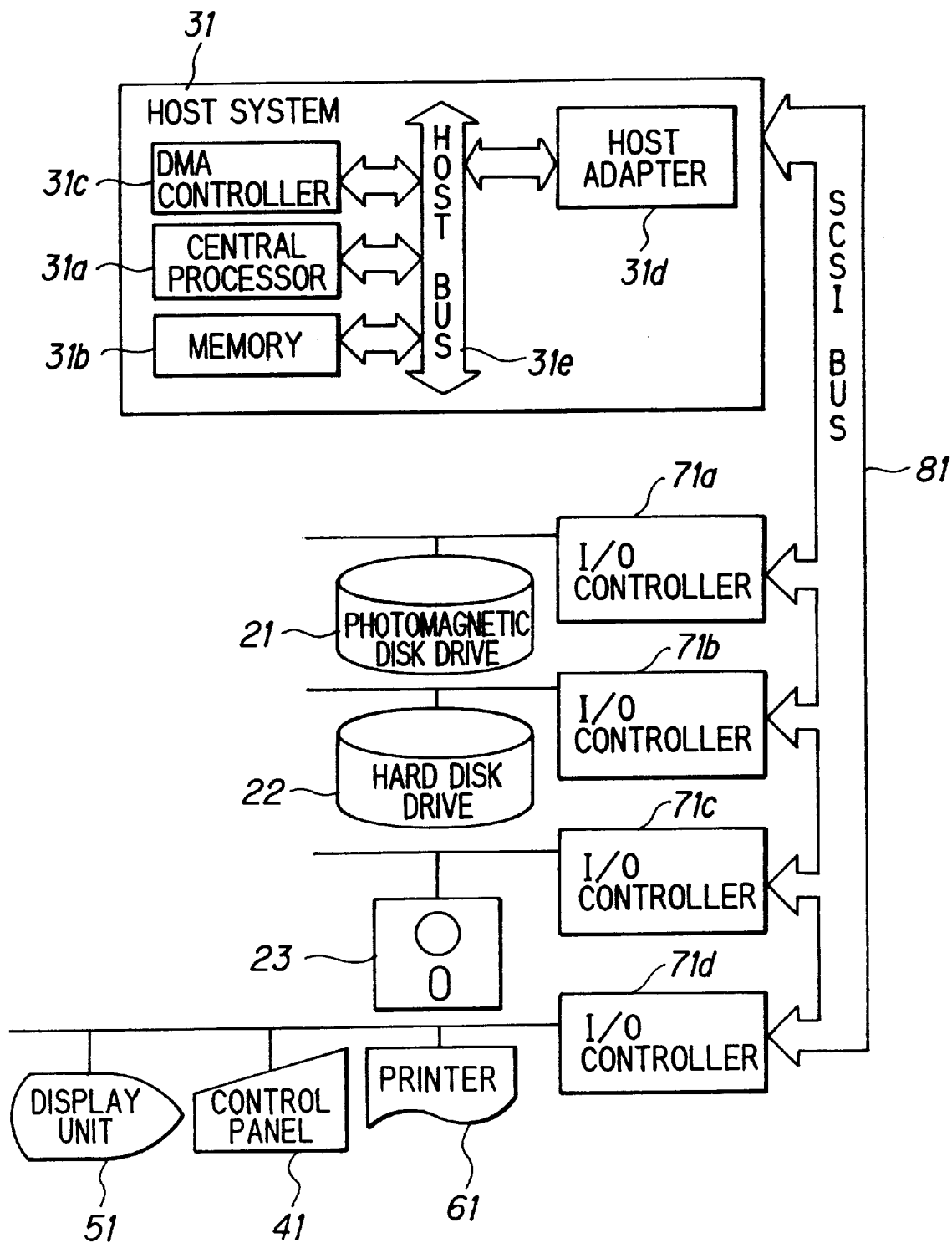
FIG. 3 is an electrical block diagram of the system to which the invention can be applied.

FIG. 3 is an electrical block diagram of the system, in which components identical with those in FIG. 2 are designated by like reference characters. Shown in FIG. 3 are the photomagnetic disk drive 21, a hard disk drive 22, a floppy disk drive 23, the host system 31, the control panel 41, the display unit 51, the printer 61, I/O controllers 71a–71d, and an SCSI bus capable of interconnecting a maximum of eight I/O controllers. The photomagnetic disk drive 21, the hard disk drive 22 and the floppy disk drive are connected to the I/O controllers 71a–71c, respectively. Though only one drive is connected to each I/O controller in FIG. 3, two or more drives can be connected to each I/O controller. The host system 31 includes a central processor 31a, a memory 31b, a DMA controller 31c and a host adapter 31d. These units are connected to a host bus 31e. The host system 31 and the I/O controllers 71a–71d are interfaced by SCSI interfaces, and each I/O controller and drive is interfaced by, say, an ESDI interface. In this system, the burden upon the host bus is alleviated by disconnecting the peripheral equipment from the host bus 31e, providing the SCSI bus 81 separately of the host bus, connecting the I/O controllers 71a–71d for the respective items of peripheral equipment to the SCSI bus 81, and controlling the peripheral equipment by the respective I/O controllers.

(c) First processing for making conversion to mixed section

Figure 4:
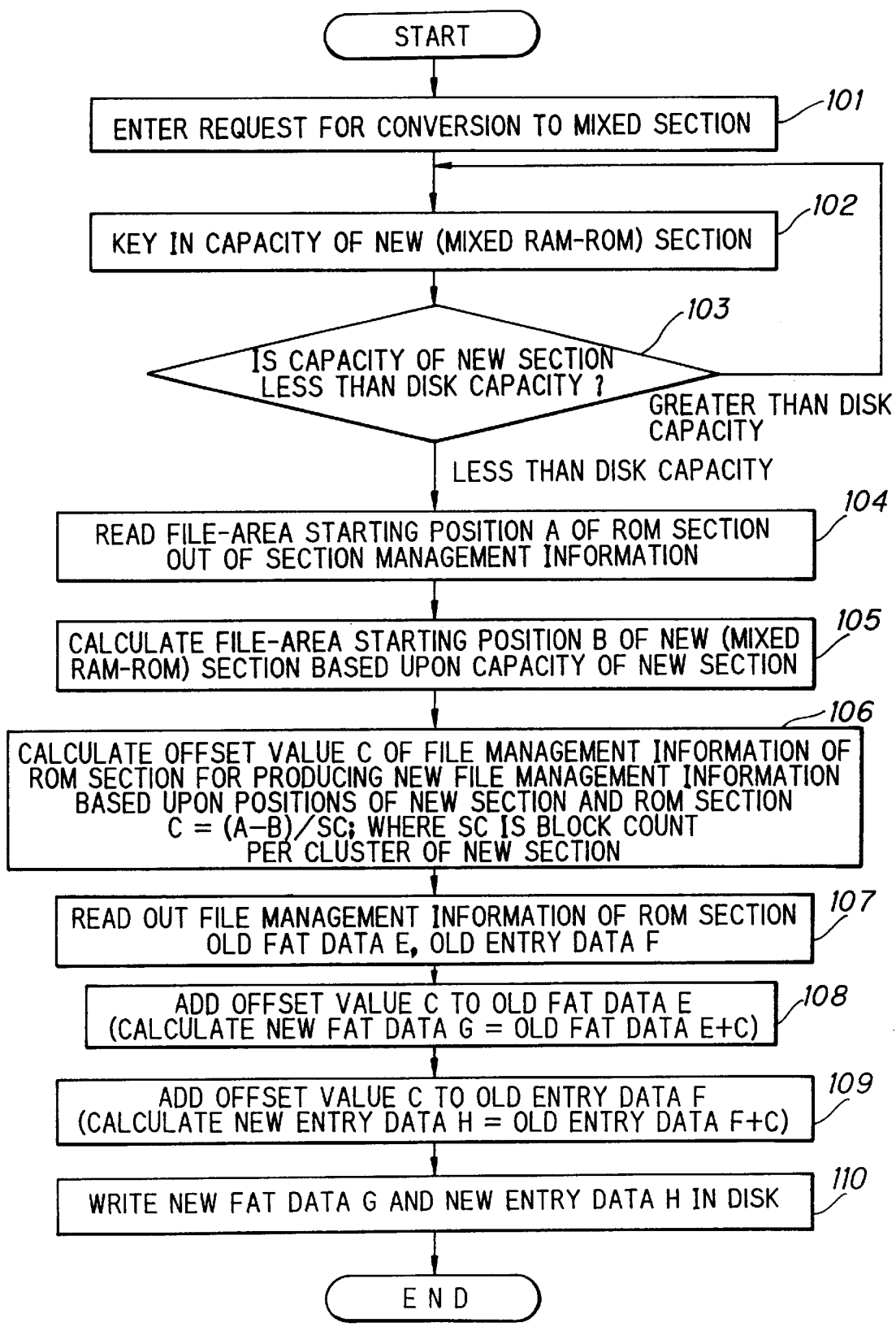
FIG. 4 is a flowchart of processing for forming a mixed section.

FIG. 4 is a flowchart of mixed-section conversion processing for a case in which the partial ROM 11 has been formatted by logical formatting in such a manner that a plurality of sections can be provided. (This corresponds to a case in which section positions can be set at will.)

Figures 6A, 6B:
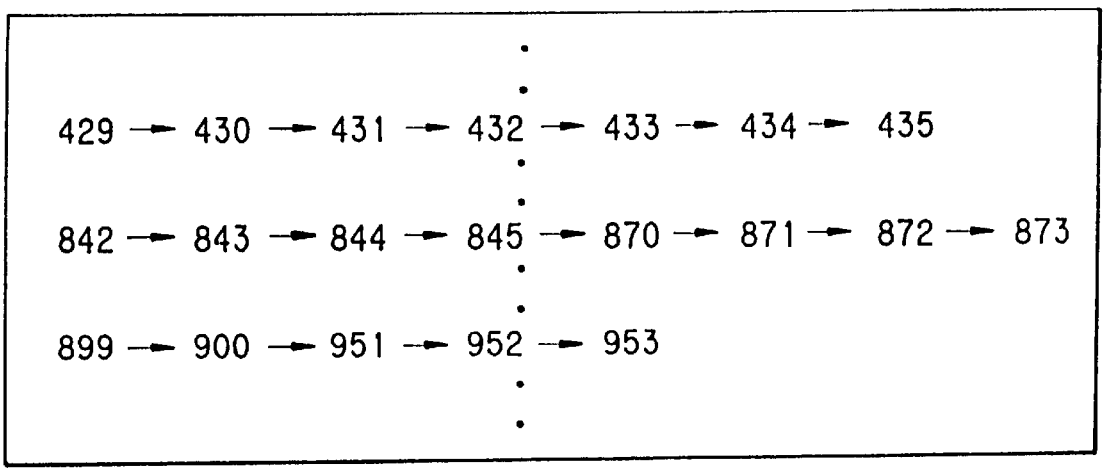
FIG. 6A is a diagram for describing directory information and FIG. 6B is a diagram for describing a space-allocation management table.

The partial ROM 11 has an overall disk capacity Md of 120 MB, and the ROM capacity Mr is 20 MB. The starting position of the file area 11a-2 of the ROM portion (ROM section) 11a is represented by a logical block number LBN of 205127 (see FIG. 5A). File management information shown in FIG. 6 has been recorded in the file management area 11a-1 of the ROM section 11a. The file management information has table-of-contents information (a directory) and a space-allocation management table (FAT). The directory indicates the correspondence between file names and first cluster numbers, and the space-allocation management table designates, by the cluster number, the location at which a ROM file has been stored. FIG. 6A is an example of a directory, in which the first cluster number of a ROM file name ABCD.1111 is 429, the first cluster number of a ROM file name EFGH.222 is 842, and the first cluster number of a ROM file name IJOM.333 is 899. FIG. 6B is an example of a space-allocation management table, in which the ROM file ABCD.111 has been stored at cluster numbers

429→430→431→432→433→434→435;

the ROM file EFGH.222 has been stored at cluster numbers

842→843→844→845→870→871→872→873;

and the ROM file IJKL.333 has been stored at cluster numbers

899→900→951→952→953.

In a case where it is desired to convert the partial ROM 11, in which the ROM area and RAM area are independent sections, to a partial ROM having the mixed ROM-RAM section, a mixed-section conversion request is entered from the control panel 41 (step 101). Next, the storage capacity M of the desired mixed section is entered. For example, 120 MB is entered as the storage capacity of the mixed section (step 102).

The host system 31 compares the entered storage capacity (=120 MB) of the mixed section with the disk capacity Md (=120 MB). That is, the host system 31 determines whether the capacity of the desired mixed section can be accommodated by one disk (step 103). If M>Md holds, i.e., if the storage capacity of the mixed section will not fit on one disk, the program proceeds to step 102, where the system waits for entry of a new mixed-section capacity. On the other hand, if M≦Md holds, i.e., if the storage capacity of the mixed section will fit on one disk, the host obtains the starting position A of the file area 11a-2 of the ROM area (ROM section) 11a in the form of the logical block number (step 104). It should be noted that the starting position A can be found by checking the file management information of the ROM section, in which case A (the logical block number)=205127 is obtained (FIG. 5A).

Next, the difference (=M−Mr=100 MB) between the capacity M of the mixed section and the storage capacity Mr of the ROM section is found in the form of the logical block count, and a position offset from the file starting position A of the ROM section by the above-mentioned difference D is found as the file starting position B of the mixed section (step 105). It should be noted that when 1 MB=1024 KB, 1 KB=1024 bytes and one block=512 bytes holds, D is found as follows:

$$D = (120-20) \text{ MB}/512$$

$$= 100 \cdot 1024 \cdot 1024/512$$

$$= 204800 \text{ blocks}.$$

Accordingly, the file starting position B of the mixed section is 205127−204800=327 (the logical block number) (see FIG. 5B).

Thereafter, the logical block count D (=204800 blocks) between the file starting position A of the ROM section and the file starting position B of the mixed section is divided by the block count SC per cluster, as a result of which the offset cluster count C between the two positions is obtained (step 106). If the block count per cluster is eight blocks, then the offset cluster count C will be 204800/8=25600 (clusters).

When the offset cluster count C has been found, a cluster number E in the space-allocation management table (FAT)

and a cluster number F in the directory, which are contained in the file management information of the ROM section 11a, are read out (step 107).

Next, the offset cluster count C is added to the cluster number E of the FAT to calculate a cluster number G (G=E+C; step 108) of the mixed section. Further, the offset cluster count C is added to the cluster number F of the directory to calculate a cluster number H (H=F+C; step 109) of the mixed section. Taking the file ABCD.111 as an example, the first cluster number, in the mixed section, of this file is 25600+429=26029 (see FIG. 5C). It should be noted that the section management information of the logical format is changed at the same time.

Next, the host system 31 writes the file management information G, H of the mixed section in the file management area 11c-1 of the mixed section (step 110). Thereafter, the operation of steps 107–110 is repeated, all of the file management information of the ROM section is converted to file management information of the mixed section and the resulting information is written in the file management area 11c-1 of the mixed section. As a result, a partial ROM having the file area 11c-1 of the mixed section and the mixed ROM-RAM file area 11c-2 is obtained (FIG. 5B).

Figures 7A, 7B:
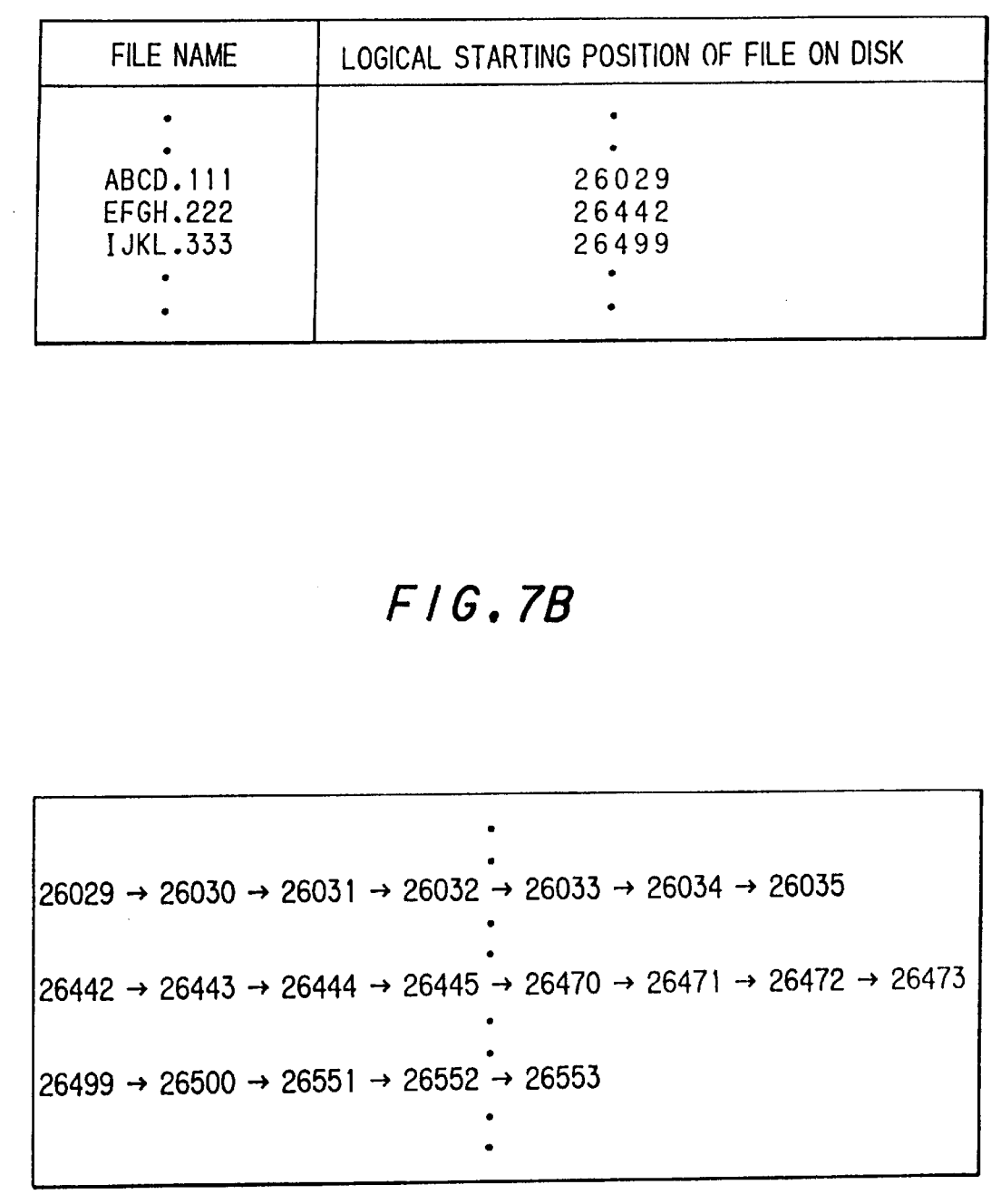

FIG. 7 is a diagram for describing the file management information of the mixed ROM-RAM section, in which FIG. 7A is a diagram for describing the directory information and FIG. 7B is a diagram for describing the space-allocation management table. It will be appreciated that these cluster numbers have been increased by the offset cluster count C (=25600) in comparison with the cluster numbers of FIGS. 6A and 6B.

Though the storage capacity of the mixed section is entered in the foregoing description, it is also possible to enter the difference between the capacity of the mixed section and the ROM capacity.

Further, let the difference between the capacity M of the mixed section and the capacity Mr of the ROM section be expressed by the logical block count, and let this be represented by D (allowable difference D). If the allowable difference D is indivisible by the block count S per cluster, then the allowable difference D is corrected to D' which is divisible by the block count S per cluster, and a position offset from the file starting position A of the ROM section by the corrected allowable difference D' is adopted as the file starting position B of the mixed section. If this arrangement is adopted, the logical recording units (clusters) of the RAM portion and ROM portion in the mixed ROM-RAM section can be made consecutive, the first block of the ROM file can be made the first block of the cluster and the ROM file can be accessed with assurance even if the mixed section is established.

Furthermore, in the case described above, the block count SC (=8) per cluster in the RAM section is equal to that in the ROM section. However, there are cases in which the block counts differ. For example, in a case where a block count $SC_1$ per cluster of the RAM section and a block count $SC_2$ per cluster of the ROM section are equal to 4 and 8, respectively, it is required that the block count per cluster of the mixed section be made a block count (=4) identical with that of the RAM section. In such case, the cluster number in the directory of the ROM section and the cluster number in the space-allocation table are converted to cluster numbers of the mixed section in the following manner: Specifically, in step 106 described above, the offset cluster count C is obtained as SC=4. Next, with regard to the cluster number F in the directory, this is converted to the cluster number H of the mixed section in accordance with the formula $$H=2 \cdot F+C$$

The reason for doubling F is that $SC_2/SC_1=2$. Further, the cluster number E of the space-allocation management table (FAT) is converted to two consecutive cluster numbers G1, G2 of the mixed section in accordance with the formulae $$G_1=2 \cdot E+C$$

$$G_2=(2 \cdot E+C)+1$$

(d) Second processing for making conversion to single section

Figure 8:
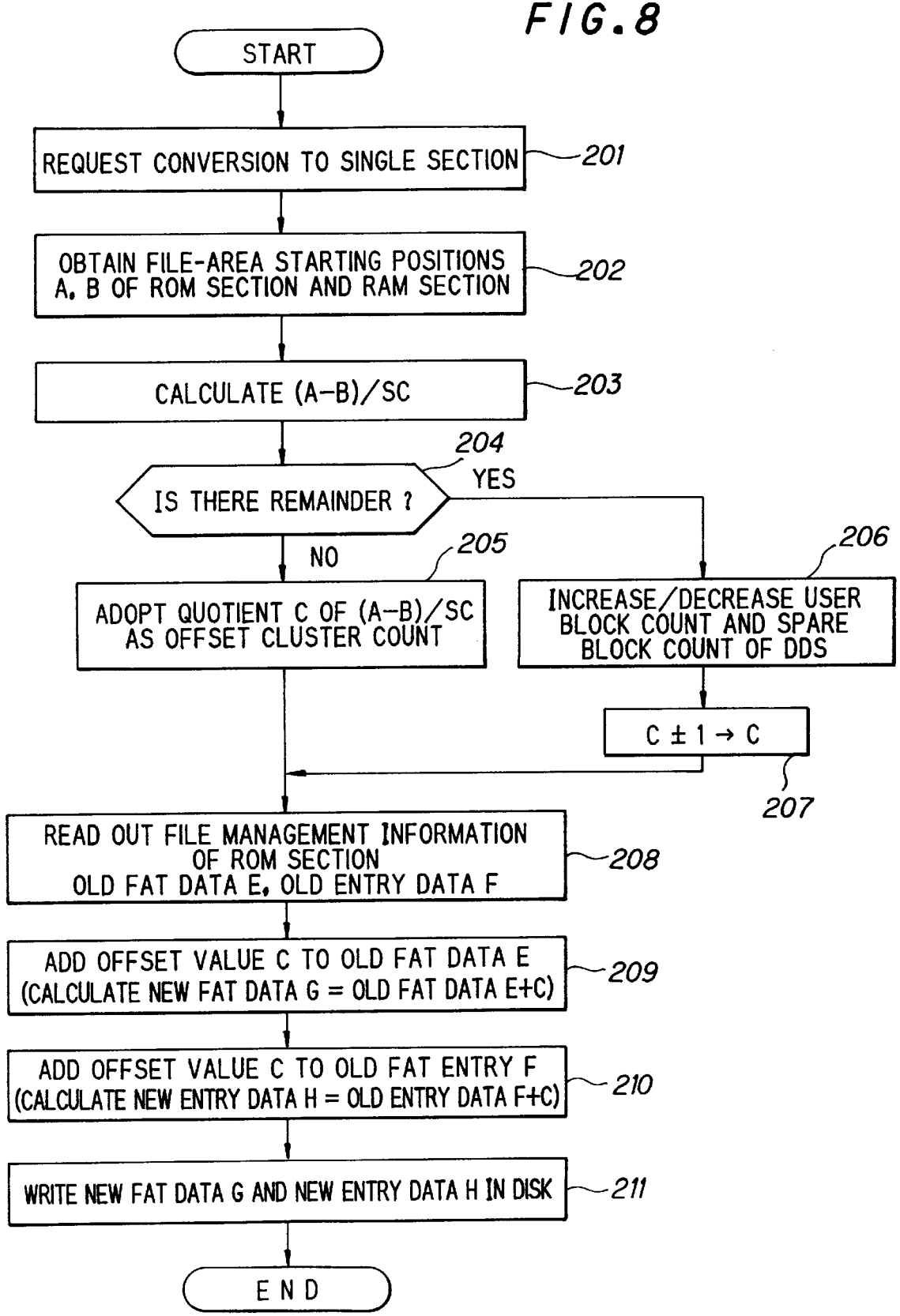
FIG. 8 is a flowchart of processing for forming a single section.

FIG. 8 is a flowchart of processing for a case in which the partial ROM 11, which has the RAM area and the ROM area and the latter serves as a ROM section that is provided with the file management area and the file area, is converted to a partial ROM having a single section that is ROM-RAM mixture.

Figure 9A:
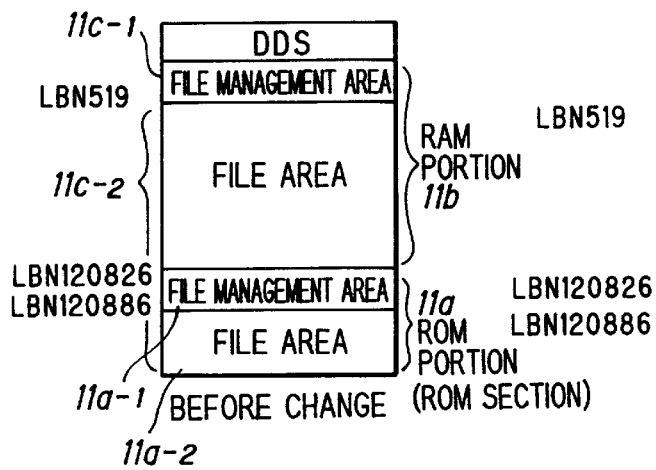
FIGS. 9A, 9B, 9C and 9D are diagrams for describing control used to form a single section.

With a logical format for producing only one section, only one section is formed on the disk; hence, the starting position of the file area is decided on the side of the logical format. Under such circumstances, the file-area starting position B of the single section and the file-area starting position A of the ROM section are fixed. Unfortunately, this means that the block count of the offset RAM portion between these positions is already decided. For example, as shown in FIG. 9A, the starting position of the file area 11c-2 of the single section is fixed, i.e., logical block number LBN=519, the starting position of the file management area 11a-1 in the ROM section 11a is fixed at logical block number LBN=120826, and the starting position of the file area 11a-2 in the ROM section 11a is fixed at logical block number LBN=120886.

File management information identical with that shown in FIG. 6 has been recorded in the file management area 11a-1 of the ROM section 11a. Further, prior to being changed, the RAM 11b is such that the user block count is 120826, the spare block count is 1024 and the remaining block count is zero, as shown in ① of FIG. 10.

In a case where it is desired to form a partial ROM having a single section that is a ROM-RAM mixture, a single-section conversion request is entered from the control panel 41 (step 201). It should be noted that a single section that is a ROM-RAM mixture means a single area in which the entire RAM area and the entire ROM area of the partial ROM are mixed.

When the request for conversion to the single section is entered, the host system 31 obtains the starting position A of the file area 11a-2 of the ROM section 11a and the starting position B of the file area 11c-2 of the single section in the form of the respective logical block numbers (step 202). It should be noted that the starting positions A, B can be found obtained from the file management information, in which case we would have A (logical block number)=120886

B (logical block number)=519

(see FIG. 9A).

Next, the logical block count (A−B) of the offset RAM portion between the starting points A and B is divided by the block count SC (e.g., SC=4) per cluster, whereby the quotient becomes C (=30091) and the remainder obtained is S (=3) (step 203). Thereafter, it is determined whether S=0 holds (step 204). If S=0 is found to hold, then C is made the offset cluster count between the starting positions A and B (step 205).

If it is found that S=0 does not hold, however, i.e., if the logical block count (A−B) of the offset RAM portion is not divisible by SC (in this example S=3 holds, indicating that the logical block count is indivisible), then the logical block number of the starting position A of the file area 11a-2 of the ROM area 11a is adjusted by increasing or decreasing the logical block count of the RAM area 11b in such a manner that (A−B) will be divisible (step 206). The reason for making the logical block count of the offset RAM portion (A−B) divisible by SC is as follows:

In a case where a partial ROM is used as a single section that is a ROM-RAM mixture, it is necessary that the logical recording units of the RAM portion and ROM portion be consecutive. According to specifications (ISO 9293) relating to the file structure of optical disks, a logical recording unit is referred to as a cluster, which comprises four physical blocks (SC=4), for example, on a disk (one block=512 bytes). Accordingly, since the first block of the first file of the ROM portion becomes the first block of a prescribed cluster in the single section, it is necessary that the block count of the offset RAM portion be divisible by SC (=4). If the block count is indivisible by SC (=4), the first block of the first file of the ROM portion will be situated not at the first block of the cluster but at some intermediate position. In such case, the relevant file will not be accessible. For this reason it is necessary that the logical block count of the offset RAM portion be divisible by SC (=4).

Figure 9B:
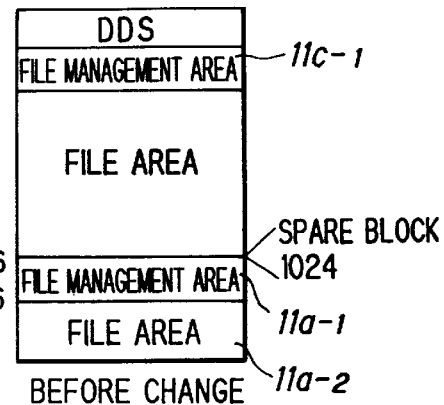

The adjustment of the logical block count of the RAM area 11b is performed as follows: Specifically, the RAM area 11b is partitioned into user blocks for storing data, spare blocks used as substitutes if user blocks have become defective, and other remaining blocks. The user employs the user blocks, but the spare blocks and remaining blocks are invisible to the user. The sum total of the user blocks, spare blocks and remaining blocks is the RAM area. Though this total block count is decided disk by disk, it is possible for the count to be changed for each disk. Accordingly, in a case where it is desired to increase or decrease the user block count, this can be accomplished by adjusting the spare block count or the remaining block count. Since the user block count and the spare block count are stored in the disk definition sector DDS, the user block count can be changed if the notations of the user block count and spare block count in the DDS are altered. For example, the user block count is 120826, the spare block count is 1024 and the remaining block count is zero (see FIG. 9B and ① in FIG. 10).

Figure 9C:
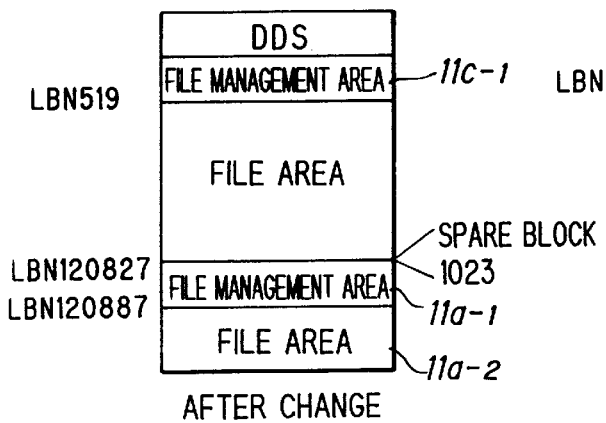

The user block count (=120826) is increased by (SC−S) (=1) and the spare block count (=1024) is decreased by (SC−S) so as not to change the total block count of the RAM area, thus altering the user block count and the spare block count in the disk definition sector DDS. As a result, the user block count becomes 120827 and the spare block count becomes 1023 (see FIG. 9C and ② in FIG. 10), and the starting positions of the file management area 11a-1 and file area 11a-2 of the ROM area 11a are each increased by one, whereby 120827, 120887 (A=120887) are obtained (see FIG. 9C). Thus, the logical block count (A−B) of the offset RAM portion is rendered divisible by SC. As a result, the continuity of the logical recording units (clusters) of the RAM portion and ROM portion can be assured. This means that when it is desired to establishe a single section that is a ROM-RAM mixture, the first block of a ROM file can be made the first block of a cluster, thereby enabling the ROM file to be accessed reliably.

Next, the operation C+1→C is performed and C (=30092) is made the offset cluster count (step 207). It should be noted that the offset cluster count C may be obtained by calculating (A−B)/SC again using a new A. Further, though it has been described that the user block count is increased and the spare block count decreased at step 206, an arrangement may be adopted in which the change is made by decreasing the user block count by S and increasing the spare block count by S and obtaining the offset block count in accordance with C−1→C. Furthermore, though a case has been described in which the user block count is increased/decreased and the spare block count is decreased/increased, it may be so arranged that the user block count is increased/decreased and the remaining block count is decreased/increased.

If the offset cluster count C has been obtained, a cluster number E in the space-allocation management table (FAT) and a cluster number F in the directory, which are contained in the file management information of the ROM section 11a, are read out (step 208). Next, the offset cluster count C is added to the cluster number E of the FAT to calculate a cluster number G (G=E+C; step 209) of the single section. Further, the offset cluster count C is added to the cluster number F of the directory to calculate a cluster number H (H=F+C; step 210) of the single section.

Figure 9D:
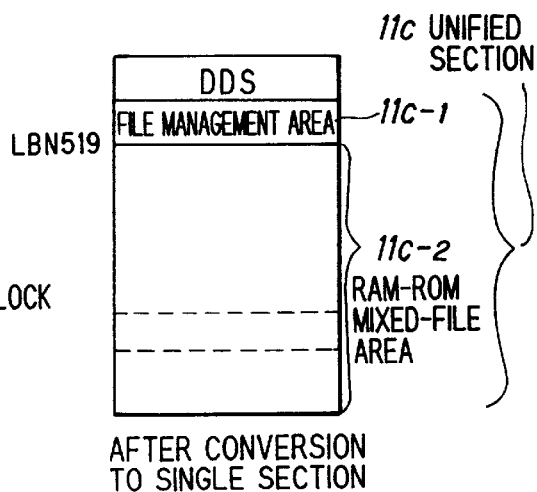
Figure 12A:
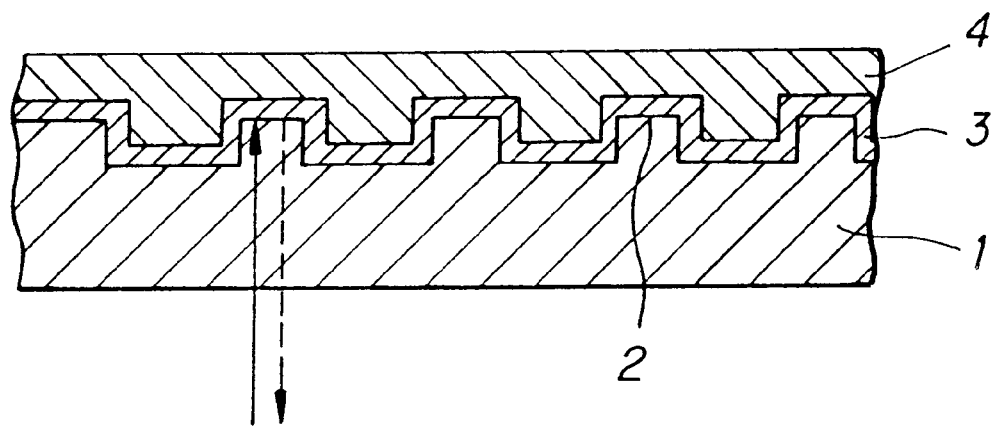
FIGS. 12A and 12B are diagram for describing a ROM disk.
Figure 12B:
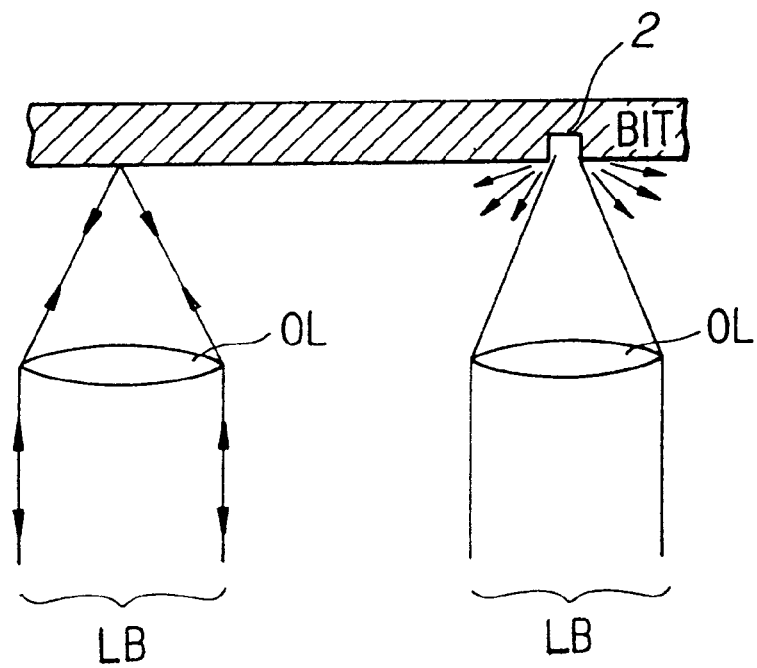
Figure 14A:
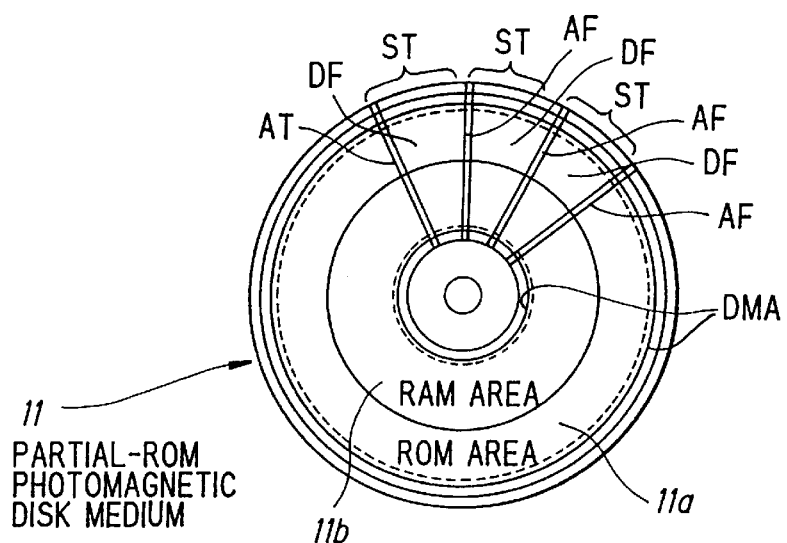
FIGS. 14A, 14B, 14C are diagrams showing the structure of a partial-ROM photomagnetic-disk medium.
Figure 14B:
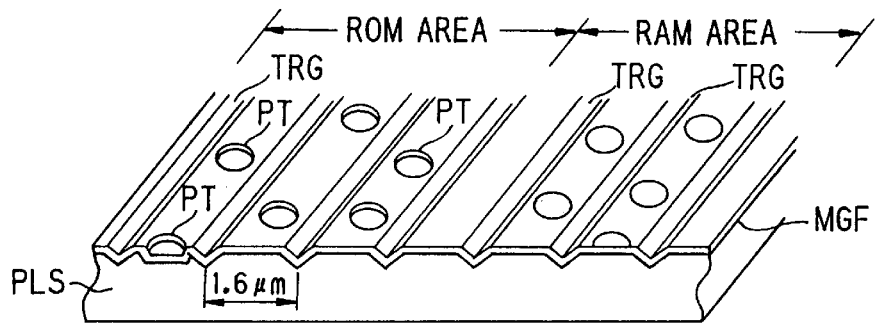
Figure 14C:
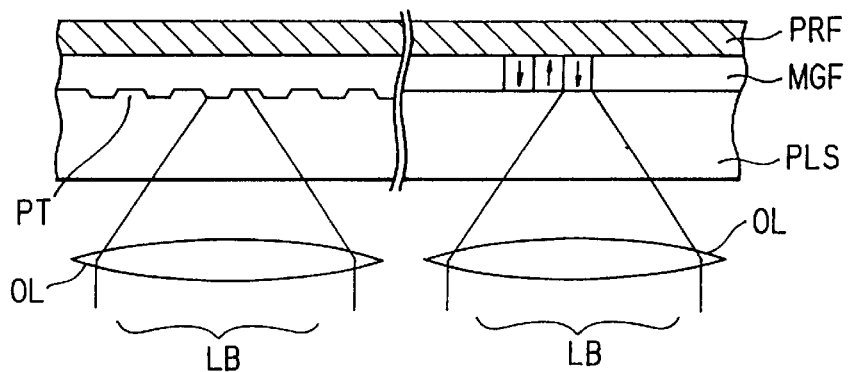
Figure 15:
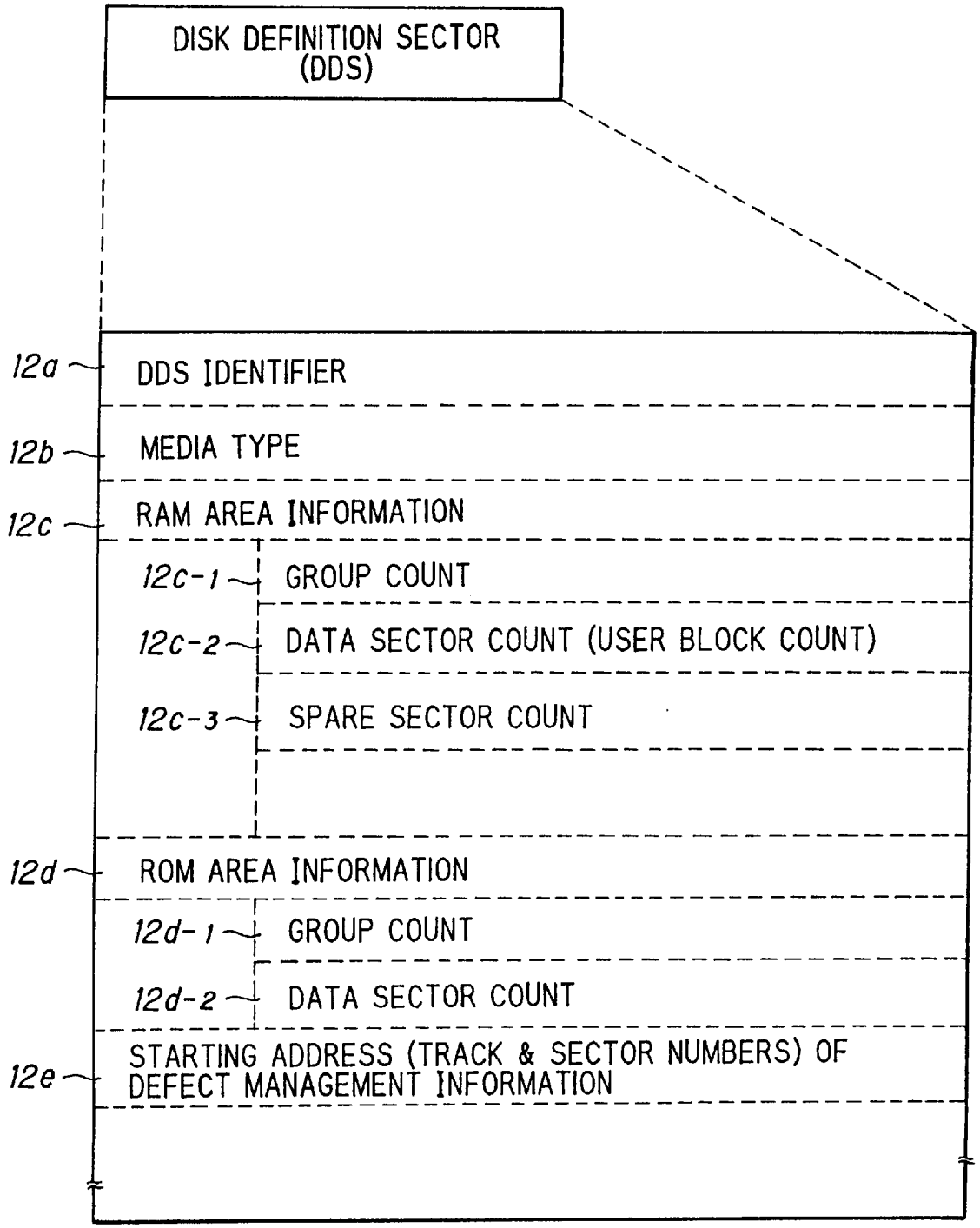
FIG. 15 is a diagram for describing a disk definition sector.
Figure 16:
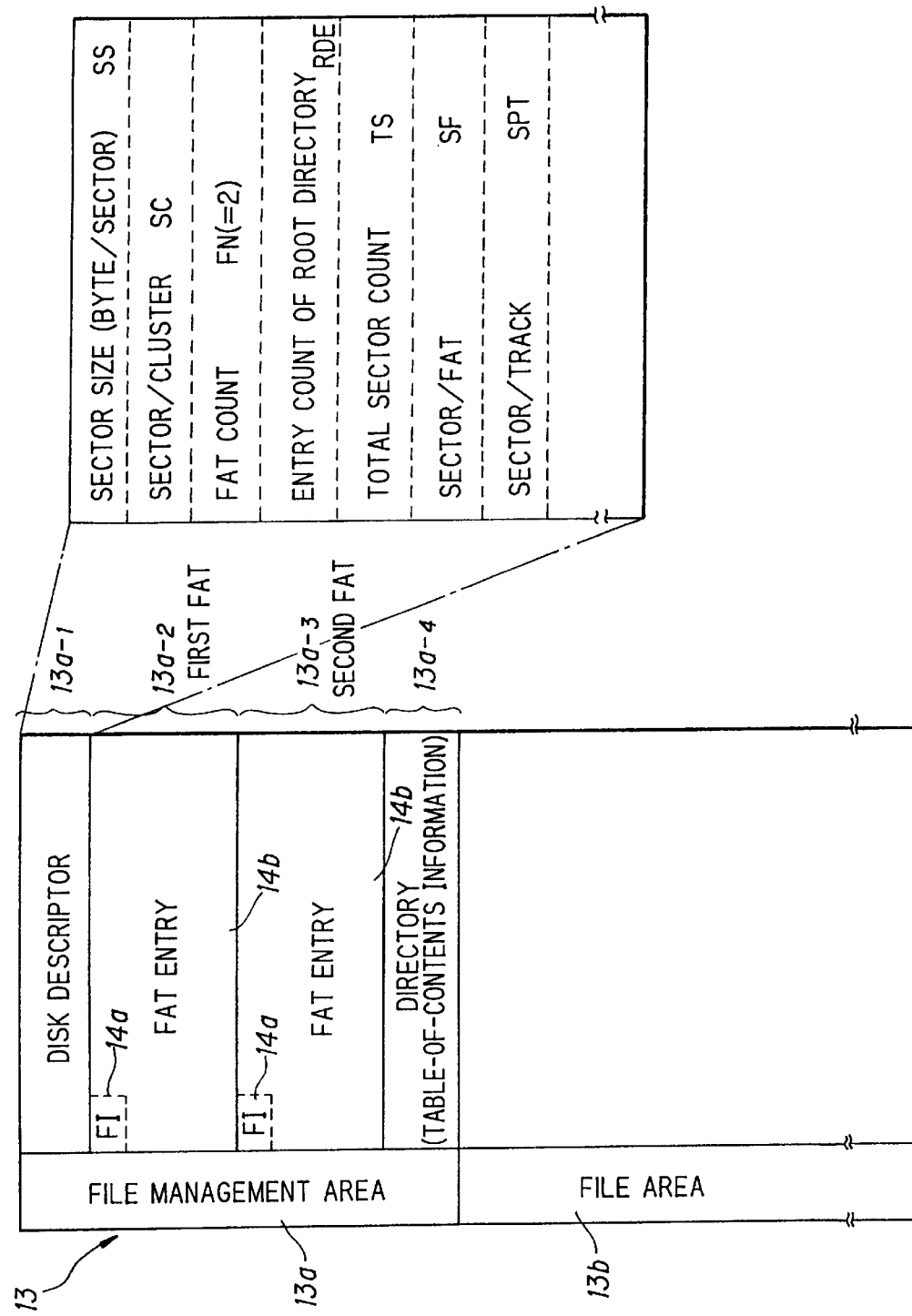
FIG. 16 is a diagram for describing the structure of a section.
Figure 17:
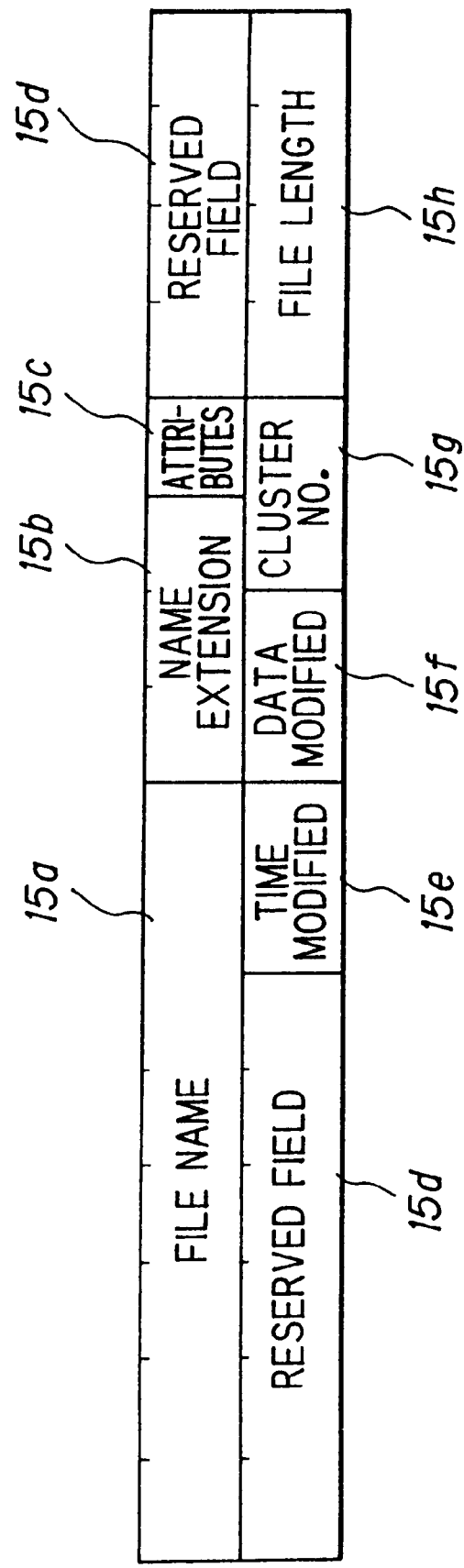
FIG. 17 is a diagram for describing the structure of a directory.
Figure 19A:
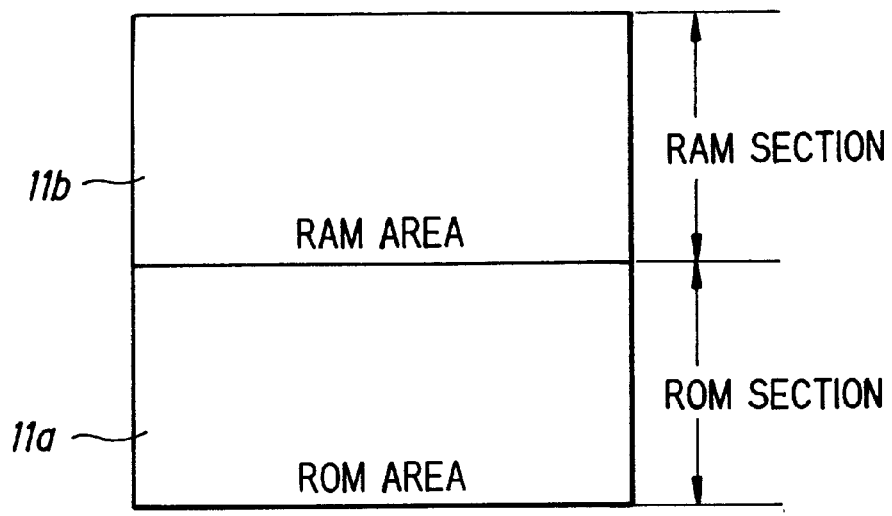
FIGS. 19A, 19B are diagrams for describing problems encountered with partial ROM according to the prior art.
Figure 19B:
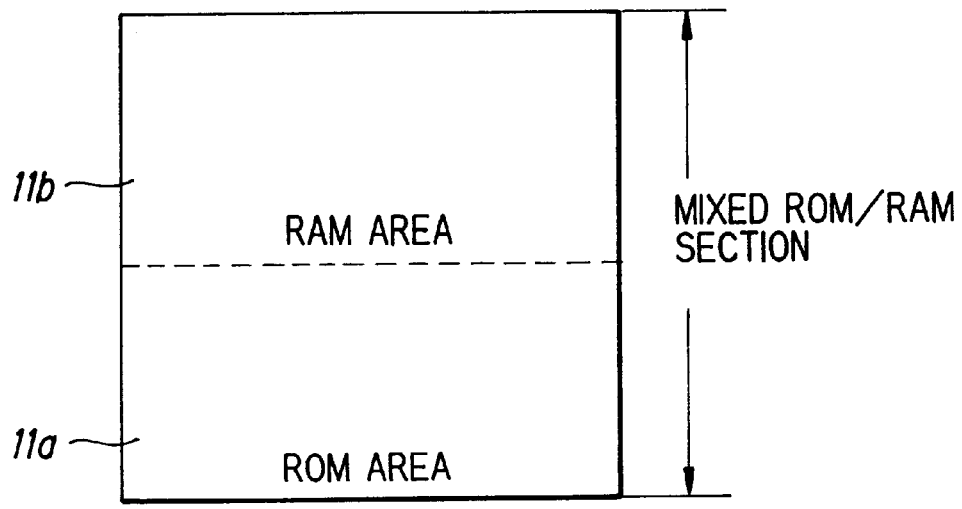

Next, the host system 31 writes the file management information (cluster numbers) G, H of the single section in the file management area 11c-1 of the single section (step 211). Thereafter, the operation of steps 208~211 is repeated, all of the file management information of the ROM section is converted to file management information of the single section and the resulting information is written in the file management area 11c-1. When this is done, the partial ROM having the ROM area and the RAM area can be converted to the partial ROM having the single section that is a ROM-RAM mixture. In other words, it is possible to obtain a partial ROM having a single section 11c, in which the part on the outer side of the file management area 11c-1 has become the mixed ROM-RAM file area 11c-2 (see FIG. 9D).

FIG. 11 is a diagram for describing the file management information of the single section that is the ROM-RAM mixture, in which FIG. 11A is a diagram for describing the directory information and FIG. 11B is a diagram for describing the space-allocation management table. It will be appreciated that these cluster numbers have been increased by the offset cluster count C (=30092) in comparison with the cluster numbers of FIGS. 6A and 6B.

In the foregoing, a case is described in which the present invention is applied to a partial-ROM photomagnetic disk. However, the present invention is not limited to such a partial ROM but is applicable also to a portable exchangeable storage medium, namely an interchangeable storage medium.

In accordance with the present invention, as described above, file management information is read out of the file management area of a ROM section in response to a request for establishing a section in which RAM and ROM sections are mixed, the file management information of the ROM section is converted to file management information of the mixed ROM-RAM section, and this file management information is written in the file management area of the mixed section. As a result, a interchangeable storage medium in which the ROM area and RAM area are independent sections can be converted to a storage medium having a mixed ROM-RAM section. Moreover, files of the ROM area and files of the RAM area can be managed as files of the same section.

Further, in accordance with the present invention, the storage capacity of the mixed section, or the difference between the storage capacity of this mixed section and the storage capacity of the ROM section, is entered. Next, the starting position A of the file area of the ROM section is obtained in the form of the logical block number, the difference D between the storage capacity of the mixed section and the storage capacity of the ROM section is obtained in the form of a logical block count, and a position offset from the file starting position A of the ROM section by the difference D is obtained as a file starting position B of the mixed section. Thereafter, the logical block count D between the file starting position A of the ROM section and the file starting position B of the mixed section is divided by the number of blocks per cluster to obtain an offset cluster count C between the two positions, the offset cluster count C is added to the cluster numbers of the file management information (namely in the directory and space-allocation management table), thereby to convert the file management information of the ROM section to file management information of the mixed section. This file management information is written in the file management area of the mixed section. As a result, from a partial ROM on a single disk, it is possible to provide at least two types of partial-ROM photomagnetic disks, such as ① a disk having separate ROM and RAM sections, ② 80 MB of a ROM-RAM mixture, ③ 100 MB of a ROM-RAM mixture, . . . , etc.

Furthermore, in accordance with the present invention, in a case where the logical block count D is found to be indivisible when it is divided by the number of blocks per cluster, the allowable difference D is corrected to D' which is divisible by the block count per cluster, and a position offset from the file starting position A of the ROM section by the corrected allowable difference D' is adopted as the file starting position B of the mixed section. As a result, the first block of a ROM file can be made the first block of a cluster even if the conversion to a mixed section is made. This makes it possible to access the ROM files with assurance.

Further, in accordance with the present invention, an interchangeable storage medium having a RAM area and a ROM area, in which the ROM area serves as a ROM section and the ROM section is provided with a file management area and a file area, may be converted to an interchangeable storage medium having a single section that is a mixture of ROM and RAM areas. More specifically, the file management information is read out of the file management area of the ROM section, the file management information of this ROM section is converted to file management information of the single section that is the ROM-RAM mixture, the file management information of this single section is written in the file management area of the single section, and ROM files and RAM files can be managed as files of the single section.

Furthermore, in accordance with the present invention, the starting position A of the file area of the ROM section and the starting position B of the file area of the single section are obtained in the form of the respective logical block numbers, and the difference between these two numbers is divided by the block count SC per cluster to find the offset cluster number C between the starting positions A and B. Next, the offset cluster count C is added to the cluster numbers of the file management information (namely in the directory and space-allocation management table) of the ROM section, thereby to convert the file management information of the ROM section to file management information of the single section. This file management information is written in the file management area of the single section. In a case where the above-mentioned difference is found to be indivisible when it is divided by the block count per cluster, the logical block number of the file-area starting position A of the ROM section is adjusted by increasing or decreasing the logical block count of the RAM area in such a manner that the difference will be rendered divisible. As a result, the first block of a ROM file can be made the first block of a cluster even if the conversion to a single section is made. This makes it possible to access the ROM file with assurance.

As many apparently widely different embodiments of the present invention can be made without departing from the spirit and scope thereof, it is to be understood that the invention is not limited to the specific embodiments thereof except as defined in the appended claims.

What is claimed is:

1. A method of managing files on an interchangeable storage medium comprising the steps of:

inputting a request for converting an optical storage medium having a RAM area originally serving as a RAM section and a ROM area originally serving as a ROM section into a storage medium having a mixed RAM-ROM section in which the RAM area and ROM area are mixed, each original section having a file management area for storing file management information and a file area for storing files;

reading file management information out of a file management area of the original ROM section in response to said request;

converting the file management information of the original ROM section to mixed RAM-ROM section file management information by making cluster numbers contained in the file management information of the original ROM section into cluster numbers of the mixed RAM-ROM section;

storing the mixed RAM-ROM section file management information in a mixed RAM-ROM section file management area;

storing file management information of the RAM section in the mixed RAM-ROM section file management area as the mixed RAM-ROM section file management information; and managing ROM files and RAM files as files of the mixed RAM-ROM section based upon the mixed RAM-ROM section file management information.

2. The method according to claim 1, wherein said interchangeable storage medium is a partial-ROM photomagnetic disk, and said original ROM and said mixed RAM-ROM file management information have directory information indicating correlation between file names and first cluster number of files, as well as a space-allocation management table that designates a storage location of a file by linkage of cluster numbers;

the file management information of the original ROM section being converted to the file management information of the mixed RAM-ROM section by making cluster numbers of the directory information and space-allocation management table, both of which are contained in the file management information of said original ROM section, cluster numbers of the mixed RAM-ROM section.

3. A method of managing files of an interchangeable storage medium having a RAM area originally serving as a RAM section and a ROM area originally serving as a ROM section, each original section having a file management area for storing file management information and a file area for storing files, said file management information including directory information indicating correlation between file names and first cluster numbers of files, and a space-allocation management table which designates a file storage location by linkage of cluster numbers, said method comprising the steps of:

entering a request for establishing a mixed RAM-ROM section, in which the RAM area and the ROM area are mixed, from said original RAM and ROM section;

determining a starting position A of the file area of the original ROM section in the form of a logical block number;

determining a difference D between the storage capacity of the mixed RAM-ROM section and the storage capacity of the original ROM section in the form of a logical block count;

determining a position, which is offset from the file starting position A of the original ROM section by said difference D, which is expressed by the logical block count, as a file starting position B of the mixed RAM-ROM section;

dividing the logical block count D between the file starting position A of the original ROM section and the file starting position B of the mixed RAM-ROM section by the number of blocks per cluster to determine an offset cluster count C between positions A and B;

adding the offset cluster count C to cluster numbers of the directory information and the space-allocation management file, both of which are contained in the file management information of the original ROM section, to convert the file management information of the original ROM section to mixed RAM-ROM section file management information;

writing said mixed RAM-ROM section file management information in a file management area of the mixed RAM-ROM section;

writing the file management information of the original RAM section in the mixed RAM-ROM section file management area; and managing ROM files and RAM files as files of the mixed RAM-ROM section.

4. The method according to claim 3, further comprising the following steps in a case where said logical block count D is found to be indivisible when it is divided by the number of blocks per cluster:

correcting the difference D to D' so that said logical block count will be rendered divisible by the number of blocks per cluster; and adopting a position, which is offset from the file starting position A of said ROM section by the corrected allowable difference D', as a file starting position B of the mixed RAM-ROM section.

5. A method of managing files of an interchangeable storage medium comprising the steps of:

inputting a request for converting an optical storage medium having RAM areas originally serving as RAM sections and a ROM area originally serving as a ROM section into a storage medium having a single mixed RAM-ROM section in which the entire RAM areas and the ROM area are mixed, each original section having a file management area for storing file management information and a file area for storing files;

reading the file management information out of the file management area of the original ROM section in response to said request:

converting the file management information of the ROM section into mixed RAM-ROM section file management information of a single mixed RAM-ROM section by making cluster numbers contained in the file management information of the original ROM section into cluster numbers of the single mixed RAM-ROM section;

storing the mixed RAM-ROM section file management information in a single mixed RAM-ROM section file management area;

storing RAM file management information originally recorded in said RAM area in the single mixed RAM-ROM section file management area as the mixed RAM-ROM section file management information; and managing ROM files and RAM files as files of the mixed RAM-ROM section based upon the mixed RAM-ROM section file management information.

6. The method according to claim 5, wherein said original ROM and mixed RAM-ROM file management information have directory information indicating correlation between file names and first cluster numbers of files, and a space-allocation management table that designates a storage location of a file by linkage of cluster numbers;

the file management information of the original ROM section being converted to the file management information of the mixed RAM-ROM section by making cluster numbers of the directory information and space-allocation management table, both of which are contained in the file management information of said original ROM section, cluster numbers of the mixed RAM-ROM section.

7. The method according to claim 6, wherein said step of converting the file management information includes the steps of:

determining a starting position of the file area of the original ROM section and a starting position of the file area of the mixed RAM-ROM section in the form of respective logical block number;

dividing a difference between the respective logical block numbers by a number of blocks per cluster to thereby determine an offset cluster count between the two starting positions; and converting the file management information of the ROM section to file management information of the mixed RAM-ROM section by adding the offset cluster count to cluster numbers of the original ROM directory information and space-allocation management table, both of which are contained in the file management information of said original ROM section.

8. The method according to claim 7, wherein said step of converting the file management information further includes an adjusting step, in a case where said difference is found to be indivisible when it is divided by the number of blocks per cluster, of adjusting the logical block number of the file starting position of the original ROM section by increasing or decreasing a logical block count of the RAM area in such a manner that the difference will be rendered divisible.

9. The method according to claim 8, wherein said RAM area has user blocks for storing data and spare blocks any of which is used as a substitute in a case where a user block has become defective, and when said difference is found to be indivisible when it is divided by the number of blocks per cluster, the number of user blocks, defined by the logical block count, is increased or decreased so as to render said difference divisible, and the number of spare blocks is decreased or increased in such a manner that the total block count of the RAM area is rendered constant.

10. The method according to claim 8, wherein said RAM area has user blocks for storing data, spare blocks any of which is used as a substitute in a case where a user block has become defective, and other blocks not used, and when said difference is found to be indivisible when it is divided by the number of blocks per cluster, the number of user blocks, defined by the logical block count, is increased or decreased so as to render said difference divisible, and the number of other blocks is decreased or increased in such a manner that the total block count of the RAM area is rendered constant.

11. The method according to claim 5, wherein said interchangeable storage medium is a partial-ROM photomagnetic disk.

12. A system for converting an optical storage medium having a RAM area originally serving as a RAM section and a ROM area originally serving as a ROM section into a storage medium having a mixed RAM-ROM section, each original section having a file management area for storing file management information and a file area for storing files, said system comprising:

an optical disk drive for reading and writing information from said optical disk medium and for reading and writing information from and to re-writable portions of said optical disk medium;

a host for controlling reading and writing of information by said disk drive, said host including means for:
reading, using said disk drive, the file management information of the original ROM section;
converting the file management information of the original ROM section to mixed RAM-ROM section file management information by making cluster numbers contained in the file management information of the original ROM section into cluster numbers of the mixed RAM-ROM section,
writing, using said disk drive, the mixed RAM-ROM section file management information and the file management information of the RAM section in a mixed RAM-ROM section file management area; and
managing ROM files and RAM files as files of the mixed RAM-ROM section.

13. The system according to claim 12, wherein said mixed RAM-ROM section file management information includes a directory indicating correlation between file names and first cluster numbers of files and a space-allocation management table designating storage locations of files by linkage of cluster numbers.

14. A system for converting an interchangeable optical storage medium having a RAM area originally serving as a RAM section and a ROM area originally serving as a ROM section, each original section having a file management area for storing file management information and a file area for storing files, said file management information including directory information indicating correlation between file names and first cluster numbers of files, and a space-allocation management table which designates a file storage location by linkage of cluster numbers, said system comprising:

an optical disk drive for reading and writing information from said optical disk medium and for writing information onto re-writable portions of said optical disk medium;

a host for controlling reading and writing of information by said disk drive, said host including means for:
reading, using said disk drive, the file management information of the original ROM section;
converting the file management information of the original ROM section to mixed RAM-ROM section file management information by determining a starting position A of the file area of the original ROM section in the form of a logical block number;
determining a difference D between the storage capacity of the mixed RAM-ROM section and the storage capacity of the original ROM section in the form of a logical block count;
determining a position, which is offset from the file starting position A of the original ROM section by said difference D, which is expressed by the logical block count, as a file starting position B of the mixed RAM-ROM section;
dividing the logical block count D between the file starting position A of the original ROM section and the file starting position B of the mixed RAM-ROM section by the number of blocks per cluster to determine an offset cluster count C between positions A and B; and
adding the offset cluster count C to cluster numbers of the directory information and the space-allocation management file, both of which are contained in the file management information of the original ROM section, to convert the file management information of the original ROM section to mixed RAM-ROM section file management information; said host further including means for
writing, using said disk drive, the mixed RAM-ROM section file management information and the file management information of the RAM section in a mixed RAM-ROM section file management area, and
managing ROM files and RAM files as files of the mixed RAM-ROM section.

15. The system according to claim 14, wherein said host further conducts said step of converting in a case where said logical block count D is found to be indivisible when it is divided by the number of blocks per cluster by:
correcting the difference D to D' so that said logical block count will be rendered divisible by the number of blocks per cluster; and
adopting a position, which is offset from the file starting position A of said ROM section by the corrected allowable difference D', as a file starting position B of the mixed RAM-ROM section.

16. An interchangeable storage medium comprising:
a mixed RAM-ROM section for storing both RAM and ROM files therein; and
a mixed RAM-ROM section file management area for storing file management information concerning said RAM and ROM files stored in said mixed RAM-ROM section,
wherein said file management information includes:
a mixed RAM-ROM file directory; and
a mixed RAM-ROM space allocation table, and
wherein said file directory includes information indicating correlation between file names and first cluster numbers of files for both RAM and ROM files, and said space allocation table designates storage locations of files by linkage of cluster numbers for both RAM and ROM files.

* * * * *